(12) United States Patent
Carroll

(10) Patent No.: US 12,522,516 B2
(45) Date of Patent: Jan. 13, 2026

(54) WASTEWATER SPECIMEN COLLECTION SYSTEM AND METHOD

(71) Applicant: Dean Carroll, Florence, TX (US)

(72) Inventor: Dean Carroll, Florence, TX (US)

( * ) Notice: Subject to any disclaimer, the term of this patent is extended or adjusted under 35 U.S.C. 154(b) by 525 days.

(21) Appl. No.: 18/051,500

(22) Filed: Oct. 31, 2022

(65) Prior Publication Data
US 2023/0133915 A1 May 4, 2023

Related U.S. Application Data

(60) Provisional application No. 63/273,915, filed on Oct. 30, 2021.

(51) Int. Cl.
*C02F 1/00* (2023.01)

(52) U.S. Cl.
CPC ........ *C02F 1/001* (2013.01); *C02F 2201/002* (2013.01); *C02F 2209/001* (2013.01); *C02F 2209/03* (2013.01); *C02F 2209/40* (2013.01); *C02F 2303/24* (2013.01)

(58) Field of Classification Search
CPC ............... C02F 1/001; C02F 2201/002; C02F 2209/001; C02F 2209/03; C02F 2209/40; C02F 2303/24; C02F 1/008; G01N 2001/1043; G01N 2001/1062; G01N 2001/1418; G01N 2001/2064; G01N 1/2035; G01N 2001/2071; G01N 1/14
See application file for complete search history.

(56) References Cited

U.S. PATENT DOCUMENTS

| | | | | |
|---|---|---|---|---|
| 2008/0237142 | A1* | 10/2008 | Carpenter | G01N 1/14 210/744 |
| 2020/0072709 | A1* | 3/2020 | Matus Garcia | G01N 1/20 |

FOREIGN PATENT DOCUMENTS

| | | | | |
|---|---|---|---|---|
| CN | 106769219 A | * | 5/2017 | ........... B08B 9/0321 |
| CN | 106959222 A | * | 7/2017 | |
| WO | WO-2022104466 A1 | * | 5/2022 | ............... G01N 1/14 |

OTHER PUBLICATIONS

English Translation of CN 106769219 A (Year: 2017).*
English translation of CN-106959222-A (Year: 2017).*

* cited by examiner

*Primary Examiner* — Terry K Cecil
(74) *Attorney, Agent, or Firm* — Isidore PLLC

(57) ABSTRACT

A wastewater solid and/or liquid specimen/sample collection system provides continuous time sampling of a liquid source. The system includes an enclosure whose temperature is maintained within a temperature range for sample collection and storage. A sample collection container within the enclosure has an inlet for receiving intake liquid flow containing the sample being collected. An intake liquid conduit in fluid connection with the enclosure/container has a second end submerged into the liquid source. A pump provides an inlet connector in fluid connection with the intake liquid conduit. A controller communicatively coupled to an electrical motor of the pump transmits a pump activation signal with pump speed and length of time for sample collection, which activates the pump to initiate suction at the inlet connector. The pump suctions intake liquid at a flow rate that allows continuous sampling of the liquid source over an entirety of the length of sampling time.

17 Claims, 16 Drawing Sheets

WASTEWATER SPECIMEN COLLECTION SYSTEM AND METHOD

PRIORITY APPLICATION

This application claims priority to U.S. provisional patent application No. 63/273,915, filed Oct. 30, 2021, the contents of which are incorporated herein by reference.

BACKGROUND

1. Field of the Invention

The present disclosure is generally related to specimen collection and/or sampling systems for a liquid flow, and in particular to specimen collection systems for partially dissolved solids in a liquid flow.

2. Description of the Related Art

Conventional sampling of wastewater typically occurs with periodic liquid or solid samples being taken from the overall liquid flow once every set interval of time (e.g., every hour) in a 24-hour time frame or over a shorter or longer time frame. The resulting measurement and/or other characteristic determine from the periodically-collected samples is then extrapolated to determine an average or total of the liquid or solid sample over the full collection time span. Unfortunately, with certain types of specimens, particularly physical specimens, this periodic sampling fails to give an accurate picture of the occurrence or non-occurrence of certain characteristics, such as RNA load, being measured or evaluated by sampling the type of specimen. Limitations with the existing process and equipment utilized makes it difficult to obtain the levels of accuracy desired when monitoring for specific characteristics associated with these types of specimens that are contained within an ongoing flow.

BRIEF SUMMARY

The present disclosure provides different embodiments of a wastewater solid and/or liquid specimen collection system, apparatus, and method that provides continuous time sampling of a liquid source containing the to-be-collected specimen. According to a first aspect, the system includes an enclosure providing an interior space whose temperature can be moderated to be within a desired temperature range for sample collection and storage during a collection cycle. The system also includes a container having an interior volume surrounded by an exterior surface with at least one inlet for receiving an intake liquid flow comprising a sample being collected within the container, the container placed within the enclosure and collecting the sample via the intake liquid flow. The system includes an intake liquid conduit having a first end in fluid connection with the interior volume of the enclosure and having a second end opposed to the first end, the intake liquid conduit extendable to have the second end submerged into a liquid source from which the sample is being collected. The system includes a pump comprising an inlet connector and an outlet connector, the inlet connector in fluid connection with the intake liquid conduit to suction intake liquid flow from the liquid source. The pump is a programmable variable speed pump that can provided different amounts of suction force on liquid within the intake liquid conduit to control a rate of flow of the intake liquid. The system includes a controller communicatively coupled to an electrical motor of the pump, and which transmits, to the electrical motor of the pump, a pump activation signal comprising pump speed and length of time for sample collection. The pump activation signal activates the pump to initiate suction at the inlet connector, wherein the pump suctions the intake liquid at a flow rate that allows continuous sampling of the liquid source over an entirety of the length of time. The controller turns off the pump in response to at least one of (i) expiration of the established (or preset) collection time or (ii) collection of a preset amount of sample.

According to one or more embodiments, the system further comprises a temperature control mechanism for maintaining a temperature of the interior space within the desired temperature range. The temperature control mechanism includes one or more of: an insulated exterior wall, a padding of insulated foam or other insulated material within the interior space and surrounding the container, a mechanical cooling source inside of the interior space, a mechanical cooling source outside the enclosure and in fluid connection with the interior space, physical ice placed within the interior space, and a temperature control sleeve surrounding the container.

According to one or more embodiments, the intake liquid conduit comprises an exterior shield of insulating material to minimize exterior heating and cooling on the liquid flowing into the interior space through an exposed section of the intake liquid conduit. Also, the intake liquid flow is maintained at an ambient temperature of the interior space, while the sample is being collected.

According to one embodiment, the container is a solid sample collection container that presents a filter housing, and a first end of the intake liquid conduit is connected to the inlet port of the container. The container further includes an outlet port that is in fluid connection with an inner volume of the container. The outlet port is further in fluid connection with the inlet connector of the pump via a connecting outlet liquid conduit, whereby intake liquid flows from the inlet port through the container and out the output port, suctioned through the inlet connector of the pump. The container includes or houses a removable filter placed within the inner volume of the container with an open end facing the inlet port and a closed end proximate to the outlet port, wherein intake liquid flows through the filter, which removes the solid sample from a liquid medium and retains the solid sample within the filter.

According to one embodiment, the container comprises a volumetric body and a removable cover that sealably fits on top of a receiving end of the volumetric body to create a sealed container volume with the filter placed therein.

According to one embodiment, the system further includes a temperature control sleeve having (i) an inner bore that is circumferentially able to fit around an exterior wall of the container, (ii) an outer surface of the temperature control sleeve made with a material capable of retaining a desired temperature range within the sleeve, and (iii) a body section disposed between the inner bore and the outer surface and within which a cooling mechanism is provided to maintain an ambient temperature of contents within the container within a preset temperature range.

According to one alternate embodiment, the container is a solid sample collection container that presents a filter housing, and the pump is a secondary pump located within the interior space of the enclosure. Additionally, the intake liquid conduit includes a conduit connector with a second intake liquid conduit coupled thereto, the second intake liquid conduit extending from the conduit connector and coupled to the at least one inlet of the container. With this embodiment, the container further includes an outlet port that is in fluid connection with an inner volume of the container. The outlet port is further in fluid connection with the inlet connector of the secondary pump via a connecting outlet liquid conduit connected to the outlet port, whereby intake liquid flows from the inlet port through the container and out the output port, suctioned through the inlet connector of the pump. The container further includes a removable filter placed within the inner volume of the container with an open end facing the inlet port and a closed end proximate to the outlet port, wherein intake liquid flows through the filter, which removes the solid sample from a liquid medium and retains the solid sample within the filter.

With this alternate embodiment, the system includes a primary pump having a first intake in fluid connection with the intake liquid conduit and which suctions, via the intake liquid conduit, a larger volume of liquid into the interior space of the enclosure than required for sample collection, to enable the sample collection to occur within a desired temperature range of the interior space. The primary pump also has a first outlet in fluid connection with a first outlet liquid conduit that enables expulsion of non-collected liquid out of the system. The primary pump is communicatively connected to the controller and receive control inputs from the controller. The system also includes a second outlet liquid conduit with a first end in fluid connection to the outlet connector of the secondary pump and a second end in fluid connection to the conduit connector, upstream of the flow of liquid within the intake liquid conduit relative to the second intake liquid conduit. The controller triggers the primary pump to operate at a rate that suctions the larger volume of liquid through the intake liquid conduit and the controller further triggers the secondary pump to operate at a rate that only suctions as much of the liquid sample from within the intake liquid conduit as required to collect the solid sample within the removable filter.

According to another embodiment, the container is a volumetric liquid sample collection container that retains the intake liquid sample, the intake liquid conduit is in fluid connection with the intake connector of the pump, and the system further includes an outlet liquid conduit with a first end in fluid connection to the outlet connector of the pump and a second end terminating inside of the liquid sample collection container. The controller programs the pump to operate at a rate that only suctions as much of the liquid sample as can be stored within the liquid sample collection container.

According to yet another embodiment, the container is a volumetric liquid sample collection container that retains the intake liquid sample, the pump is a secondary pump located within the interior space of the enclosure, and the intake liquid conduit comprises a conduit connector with a second intake liquid conduit coupled thereto to fluidly connect with the intake connector of the secondary pump. The system further includes a primary pump having a first intake in fluid connection with the intake liquid conduit and which suctions, via the intake liquid conduit, a larger volume of liquid into the interior space of the enclosure than required for sample collection, to enable the sample collection to occur within a desired temperature range of the interior space. The primary pump also has a first outlet in fluid connection with a first outlet liquid conduit that enables expulsion of non-collected liquid out of the system, and the primary pump is communicatively coupled to the controller and receiving control inputs from the controller. The system further includes a second outlet liquid conduit with a first end in fluid connection to the outlet connector of the secondary pump and a second end terminating inside of the liquid sample collection container. The controller triggers the primary pump to operate at a rate that suctions the larger volume of liquid through the intake liquid conduit, and the controller further triggers the secondary pump to operate at a rate that only suctions as much liquid sample from within the intake liquid conduit as can be stored within the liquid sample collection container.

According to one embodiment, the system further includes a pressure sensor communicatively connected to the controller. The controller monitors, via the pressure sensor, a pressure reading at an inlet to the pump to sense a filter pressure, and the controller dynamically modifies a flow rate of the pump based on the pressure reading.

According to one embodiment, the system further includes a wireless receiver integrated within a control board of the controller and communicatively connected to the controller. The system also includes a flow rate sensor with wireless transmitting capability. The flow rate sensor is submerged within the liquid source at a location proximate to the intake end of the intake liquid conduit, and the flow rate sensor monitoring the flow rate of the liquid source and wirelessly transmit the flow rate to the controller. The controller receives, via the wireless receiver, the flow rate of the liquid source, and the controller performs the calculating of and dynamically adjusts an operating speed of the pump, in part based on the flow rate of the liquid source.

According to another embodiment, the system further includes a wireless transceiver communicatively connected to the controller. The controller receives via the wireless transceiver, one or more inputs from a wirelessly connected user device, the inputs being one or more of a group comprising: an amount of the sample to be collected, a pump speed, a length of time for sample collection, a notification requirement on completion of sample collection, and the pump activation signal to initiate suction at the inlet connector. The controller calculates a pump speed of the pump that will cause the pump to operate and collect the amount of the sample, the calculation based on retrieved and received data from among pump speed calculation data that includes characteristics of the pump, the amount of the sample to be collected, and the length of time. The controller wirelessly connects to and transmits one or more signals and data from among process status data, error signals, and collection completion signals, to a user device communicatively connected to the wireless transceiver.

In one embodiment, the system further includes a display coupled to the controller, and the controller further presents information on the display related to an ongoing sampling and visually identifies relevant information related to the sampling, the relevant information including when the sampling is completed.

Another aspect of the disclosure provides an apparatus for collecting samples from a liquid source. The apparatus includes a container having an interior volume surrounded by exterior walls with at least one inlet for receiving an intake liquid flow comprising a sample being collected within the container. The apparatus includes an intake liquid conduit having a first end in fluid connection with and extending from the at least one inlet of the container and having a second end opposed to the first end, the intake liquid conduit extendable to have the second end submerged into a liquid source from which the sample is being collected. The apparatus includes a pump having an inlet connector in fluid connection with the intake liquid conduit to suction intake liquid flow from the liquid source, the pump being a programmable variable speed pump that can provided different amounts of suction force on intake liquid within the liquid conduit to control a rate of flow of the intake liquid. The apparatus includes a controller communicatively coupled to an electrical motor of the pump. The controller receives inputs identifying an amount of the sample to be collected and a length of time for collecting the sample. The controller calculates a pump speed of the pump that will cause the pump to operate and collect the amount of the sample, the calculation based on retrieved and received data from among pump speed calculation data that includes characteristics of the pump, the amount of the sample to be collected, and the length of time. The controller transmits, to the electrical motor of the pump, a pump activation signal comprising the pump speed and length of time, the pump activation signal activating the pump to initiate suction at the inlet connector. The pump suctions the intake liquid at a flow rate that allows continuous sampling of the liquid source over an entirety of the length of time. According to one embodiment, in calculating the pump speed, the controller calculates revolutions per minute (RPMs) of a rotating impeller of the pump.

Another aspect of the disclosure provides a method for sampling a liquid source. The method includes receiving, at a controller of a continuous-sampling system, inputs identifying an amount of a sample to be collected and a length of time for collecting the sample from the liquid source. The method includes calculating a pump speed of a pump utilized to suction intake liquid from the liquid source, the pump speed causing intake liquid flow at a flow rate that will enable the pump to collect the amount of the sample within the length of time, the calculation based on retrieved and received data from among pump speed calculation data that includes characteristics of the pump, the amount of the sample to be collected, and the length of time. The method includes transmitting, to an electrical motor of the pump, a pump activation signal comprising the pump speed and length of time, the pump activation signal activating the pump to initiate suction at the inlet connector at the pump speed, wherein the pump suctions the intake fluid at the flow rate that allows continuous sampling of the liquid source over an entirety of the length of time. The method further includes turning off the pump in response to at least one of (i) expiration of the preset collection time or (ii) collection of a preset amount of sample.

According to one embodiment, the method further includes monitoring, via a pressure sensor communicatively connected to the controller, a pressure reading corresponding to an amount of pressure sensed at a filter used to collect solid samples from the intake liquid. The method also includes dynamically modifying a flow rate of the pump based on the pressure reading.

According to another embodiment, the method further includes receiving, via a wireless receiver from a flow rate sensor, a flow rate of the liquid source, the flow rate sensor communicatively connected to the controller via the wirelessly receiver, the flow rate sensor submerged within the liquid source at a location proximate to the intake end of the intake liquid conduit. The method includes dynamically adjusting an operating speed of the pump, in part based on the flow rate of the liquid source.

According to one embodiment, the method further includes wirelessly connecting, via a wireless transceiver, to a user device and transmitting, to the user device, one or more signals and data from among process status data, error signals, and collection completion signals.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
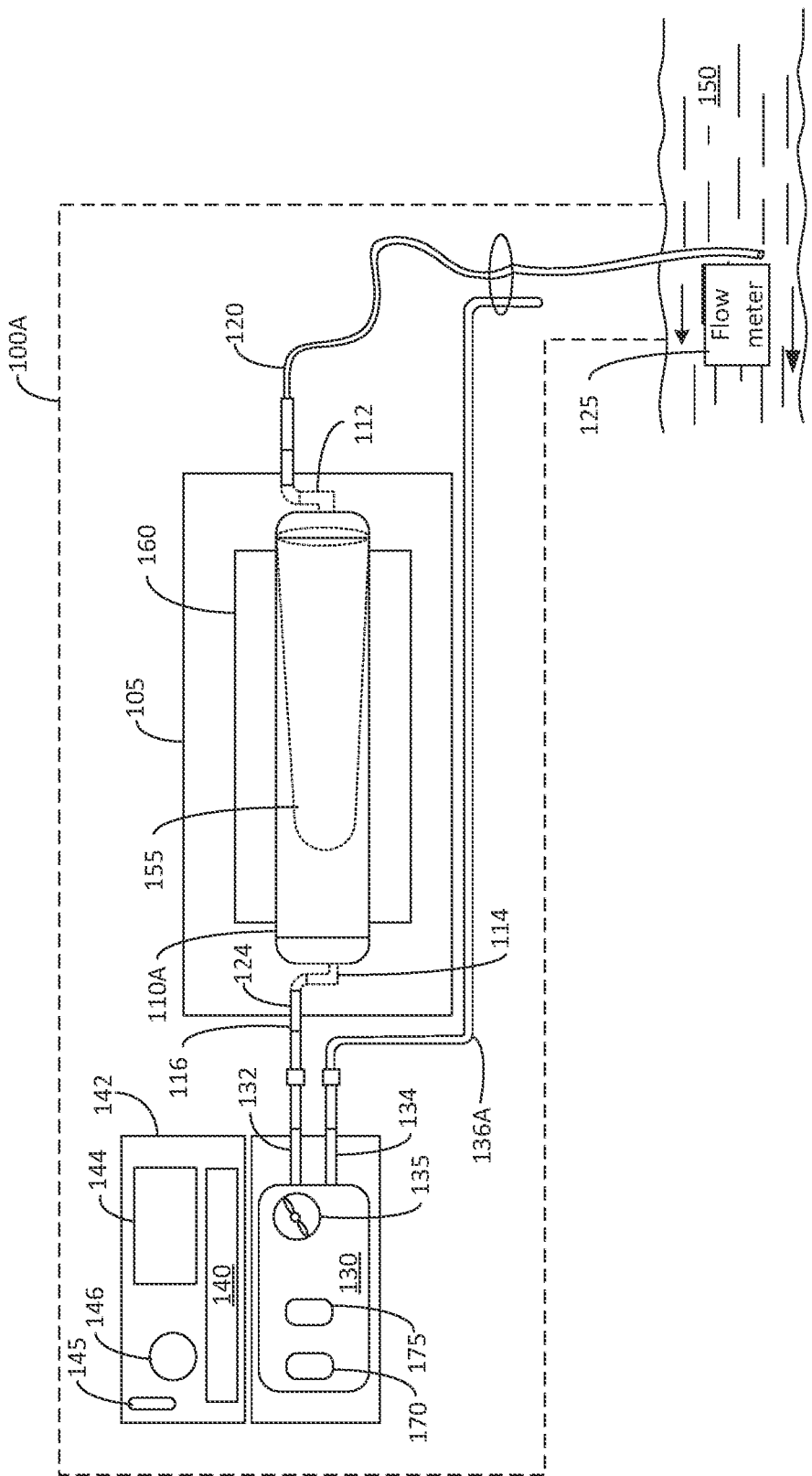
FIGS. 1A and 1B present different illustrations of an example RNA solid specimen collection (RSSC) system, according to two different embodiments.

The present disclosure provides different embodiments of a wastewater solid and/or liquid specimen collection system, apparatus, and method that provides continuous time sampling of a liquid source containing the to-be-collected specimen. According to a first aspect, the system includes an enclosure providing an interior space whose temperature can be moderated to be within a desired temperature range for sample collection and storage during a collection cycle. The system also includes a container with at least one inlet for receiving an intake liquid flow comprising the sample being collected within the container. An intake liquid conduit has a first end in fluid connection with the interior volume of the enclosure/container and a second end submerged into a liquid source from which the sample is being collected. A pump provides an inlet connector in fluid connection with the intake liquid conduit to suction intake liquid flow from the liquid source. A controller is communicatively coupled to an electrical motor of the pump and transmits a pump activation signal with pump speed and length of time for sample collection, which activates the pump to initiate suction at the inlet connector. The pump suctions the intake liquid at a flow rate that allows continuous sampling of the liquid source over an entirety of the length of time. The controller turns off the pump in response to at least one of (i) expiration of the established collection time or (ii) collection of a preset amount of sample.

According to several of the presented embodiments, the system can be utilized as a wastewater ribonucleic acid (RNA) solid specimen collection (SSC) system, apparatus, and method that provides complete time sampling of a liquid flow that may contain solid RNA specimens desired to be sampled. Unlike traditional fluid collection with wastewater, which utilizes periodic sampling of liquid, followed by generalized extrapolation to yield composite data, the present disclosure enables continuous sampling over a set sampling time period, with continuous solid or liquid sample collection. The various embodiments of the system, apparatus, and method described herein enable the collection of a complete (from a time perspective) and more accurate yield of the desired sample.

The present innovation provides a mechanism for proper testing of RNA and other organic residue in fluid sources that will yield usable results for monitoring and evaluating disease and health of a community based on the associated wastewater. The innovation stems from an understanding that the RNA testing is based on the feces expelled by humans in the regular course of the 24-hour day. Thus, unlike traditional sampling of wastewater treatment plant (WWTP) sampling (WWTP sampling), RNA sampling has very different requirements. With wastewater plants, filters are provided primarily to filter and remove solids and contaminates, then release clean water. The input and output of the plants are monitored. In this environment, samplers were designed to retrieve small samples of the liquid or solid periodically. The total incoming solids can then be calculated based on the average solids in and the flow, which is known and/or can be monitored or mechanically measured. This averaging of solids is accomplished by taking samples based on time or amount of flow. A conventional sampling approach provides a 24-hour composite in which samples are taken periodically every time interval or flow volume. This provides reasonable data for the WWTP process. However, this data is not sufficient for RNA analysis of a population using a sampling of feces within the liquid flow over a 24-hour period, given that the timing of bowel movements are not constant and may be missed completely when the sampling is only done periodically.

The present disclosure thus recognizes and address several of the differences in the applications for filtering between the RNA sampling process and the WWTP sampling process. First, while WWTP sampling is only concerned with the general population represented by the incoming solids and the results of the solids removal process, RNA sampling is concerned with both the population as a whole and as much smaller groups. Additionally, the following differences are identified:

WWTP solids are not specific to a person, i.e., of 10 lbs of solids in 10,000 gallons, any part of that 10 lbs can be used to get that average of 10 lbs. In contrast, RNA is concerned with the individual or smaller group results. With RNA testing, each person's solids should be targeted as each person may or may not have RNA.

With WTTP sampling, an average value with reasonable accuracy is easy to get with periodic sampling of 15 to 60 minutes per sample. The density of the solids in the flow typically does not spike suddenly. Collecting every 15 minutes, with each sample intake at the source lasting 10 seconds for 200 ml, would provide 960 seconds of the 24-hour flow. This process thus leaves the remaining 85,440 seconds in the day not represented. RNA testing does not do well with such periodic sampling, as much of the RNA data is lost and unsampled.

Errors in the value for solids in a WWTP are not critical data. Errors within RNA testing has the potential to be much more critical. Testing for RNA targets different aspects of the flow and has different challenges. Using COVID-19 as an example, a single infected person can deposit source material into the stream that carries excrement from ten or 100 people in an apartment complex. If this material carries or includes traces of a disease, e.g., COVID-19, missing the material for that single person in the sample induces errors in sampling that cannot be removed or reversed by extrapolations or calculations.

According to one aspect, sampling closer to the liquid source is preferred, as the deposited material gets intermixed with other material from other sources as the material travels down the sewer shed. The further down the sewer shed the material travels, the more homogenized the material becomes, to a point where the material still occupies a limited section of the flow and is not ubiquitous. As a result, the most homogenized location is the primary clarifier, but this also represents the largest population. The present disclosure appreciates that the closer to the source the sampling is performed with the provided apparatus, the smaller the section of flow that has the source material within it. The disclosure thus addresses the need for specific equipment designed with RNA sampling (and similar type sampling) as its design goal.

Figure 1B:
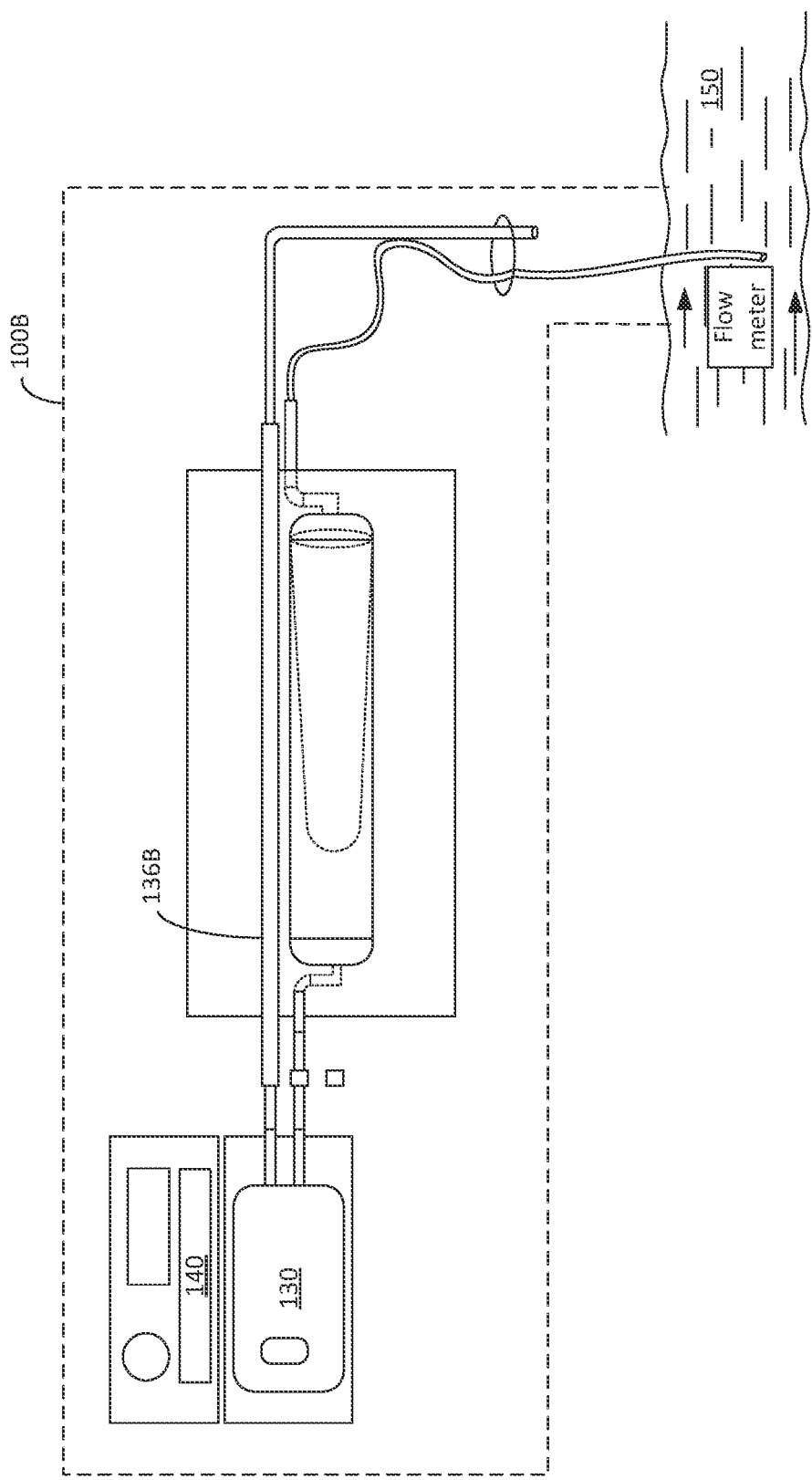

Referring now to the figures, and beginning with FIGS. 1A-1B, there are illustrated two embodiments of a system 100A designed with specific functional aspects to be utilized to enable wastewater solid specimen collection that provides complete time sampling of a liquid flow containing the solid specimen desired to be sampled. Specifically, FIGS. 1A and 1B present different illustrations of an example solid specimen collection (SSC) system 100A and 100B, according to two different embodiments. For simplicity, both embodiments are collectively referred to herein as system 100. It is appreciated that system 100A of FIG. 1A differs from system 100B of FIG. 1B with respect to the outlet/return conduit 136A/136B passing outside of the enclosure (FIG. 1A) versus inside of the enclosure (FIG. 1B). As illustrated, the system 100 includes an enclosure 105 providing an interior space whose temperature can be moderated to be within a desired temperature range for sample collection and storage during a collection cycle. The system 100A also includes a container 110A having an interior volume surrounded by an exterior surface that includes at least one inlet port 112 for receiving an intake liquid flow comprising a sample being collected within the container 110A. The container 110A is placed within the enclosure 105 and collects the sample via the intake liquid flow (through intake liquid conduit 120 in fluid connection inlet port 112). The system 100A includes an intake liquid conduit 120 having a first end in fluid connection with the interior volume of the enclosure 105. In the present embodiment, the first end of intake liquid conduit 120 is in fluid connection with the inlet port 112 of container 110A. Intake liquid conduit 120 has a second end 122, opposed to the first end, and the intake liquid conduit 120 is extendable to have the second end 122 submerged into a liquid source 150 from which the sample is being collected. The system 100A includes a pump 130 that includes an inlet connector 132 and an outlet connector 134. The inlet connector 132 is in fluid connection with the intake liquid conduit 120 to suction intake liquid flow from the liquid source 150. It is appreciated that the connection does not need to be a direct connection for the suction force of the pump to be in fluid connection with the intake liquid connection, and an intermediary connection through container 110A is illustrated in the present embodiments. The pump 130 is a programmable variable speed pump that can provided different amounts of suction force on liquid within the intake liquid conduit 120 to control a rate of flow of the intake liquid. According to one or more embodiments, the pump 130 includes an impeller controlled by a motor (collectively 135) that generates the suction force to pull the liquid through the different conduits from the liquid source 150. The pump 130 also includes a pressure sensor 170 whose functionality will be described in greater detail below.

Figure 2:
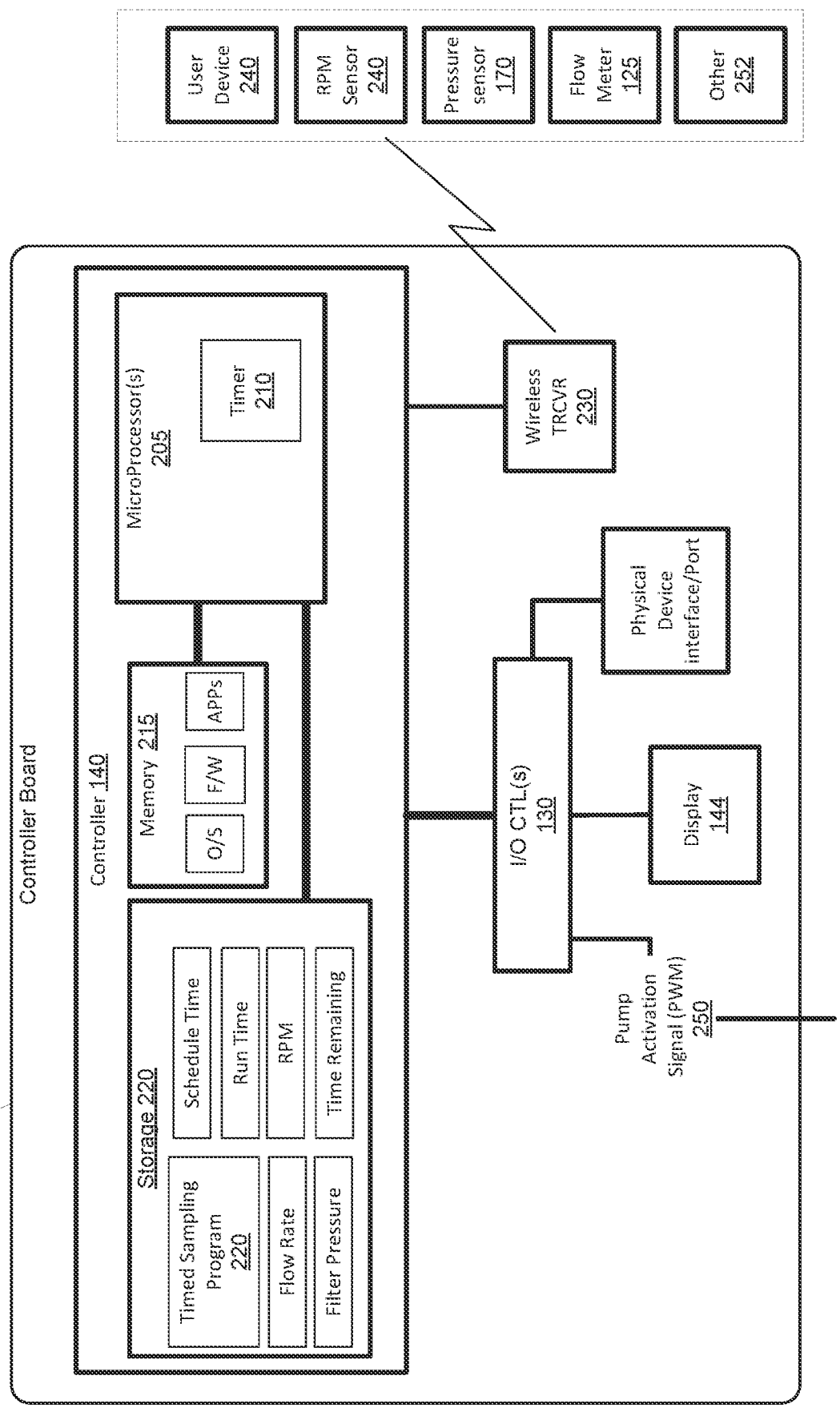
FIG. 2 presents a block diagram representation of components of an example controller, with secondary sensors and user devices in communication therewith, according to one or more embodiments.

The system 100 includes a controller 140 communicatively coupled to an electrical motor 135 of the pump, and which transmits, to the electrical motor 135 of the pump, a pump activation signal (250, FIG. 2) that includes pump speed and length of time for sample collection. FIG. 2 presents a block diagram representation of example components of an example controller (or control system), with secondary sensors and user devices in communication therewith, according to one or more embodiments. FIG. 2 is described with ongoing reference to FIGS. 1A-1B. As provided by that figure, controller 140 includes a microprocessor (or central processing unit) 205, which provides or supports functions of timer 146/210. Controller 140 also includes a memory 215 and storage 220, both communicatively connected to microprocessor 205 via one or more system interconnects on controller board 142. Memory and/or storage includes a timed sampling program 222 that includes program code, which are executed by microprocessor 205 to perform the various control aspects of the disclosure. Also connected to microprocessor 205 and integrated onto controller board 142 are wireless transceiver 145/230. Wireless transceiver 230 enables controller 140 to wirelessly communicate with devices exterior to (i.e., not include or incorporated within or on) controller board 142. Among these devices are user device 240, pressure sensor 170, PWM sensor 175, flow rate sensor (or flow meter) 125, and other possible devices (generally 252). The features provided by these external devices will be described in greater detail below. During operation, controller 140 generates pump activation signal (PWM) 250. The pump activation signal (PWM) 250 activates the pump 130 to initiate suction at the inlet connector 132, wherein the pump suctions the intake liquid at a flow rate that allows continuous sampling of the liquid source over an entirety of the length of time. The controller 140 includes a timer 210 and turns off the pump 130 in response to at least one of (i) expiration of the established (or preset) collection time or (ii) collection of a preset amount of sample.

According to one embodiment, the system 100 further includes a pressure sensor 170 communicatively connected to the controller 140. The controller 140 monitors, via the pressure sensor 170, a pressure reading at an inlet (132) to the pump 130 to sense a filter pressure, and the controller 140 dynamically modifies a flow rate of the pump based on the pressure reading. According to one embodiment, the pressure sensor monitors pressure at the inlet side to the filter to sense filter pressure. In another embodiment, the pressure is monitored on the intake side of pump so pressure cannot be built up if the filter clogs.

In one embodiment, the system also includes an RPM sensor 175 to provide feedback to controller 140 on whether the RPM of the motor is at the correct speed, to adjust for instances whether the power source may degrade over time.

According to one embodiment, the system 100 further includes a wireless receiver (part of wireless transceiver 230) integrated within a controller board 142 of the controller 140 and communicatively connected to the controller (i.e., the microprocessor 205). The system 100 also includes a flow rate sensor (or flow meter) 125 with wireless transmitting capability. The flow rate sensor 125 is submerged within the liquid source 150 at a location proximate to the intake end (122) of the intake liquid conduit 120, and the flow meter 125 monitors the flow rate of the liquid source 150 and wirelessly transmits the sensed/measured flow rate to the controller 140. The controller 140 receives the flow rate of the liquid source 150 from the flow meter 125, via the wireless receiver 230. The controller 140 performs the calculating of and dynamically adjusts an operating speed of the pump 130, in part based on the flow rate of the liquid source 150.

According to one embodiment, the controller 140 controls the speed of the main pump with feedback (from the flow meter 125) to match the velocity of the source fluid (250).

According to another embodiment, the system 100 further includes a wireless transceiver 230 communicatively connected to the controller. The controller 140 receives, via the wireless transceiver 230, one or more inputs from a wirelessly connected user device 240, the inputs being one or more of a group comprising: an amount of the sample to be collected, a pump speed, a length of time for sample collection, a notification requirement on completion of sample collection, and the pump activation signal to initiate suction at the inlet connector. These received inputs can be held within memory 215 or stored within storage 220 for later access, in alternate embodiments. The controller 140 calculates a pump speed of the pump 130 that will cause the pump 130 to operate and collect the desired amount of the sample. The calculation is based on retrieved (from storage 220) and received data from among pump speed calculation data that includes characteristics of the pump, the amount of the sample to be collected, and the length of time. The controller 140 wirelessly connects to and transmits one or more signals and data from among process status data, error signals, and collection completion signals, to a user device 240 communicatively connected to the wireless transceiver 230.

In one embodiment, the system 100 further includes a display 144 coupled to or as a part of the controller 140 as well as other instrumentation panels for input and output operations. The controller 140 further presents information on the display 144 related to an ongoing sampling operation, and the controller 140 visually identifies relevant information related to the sampling. According to one embodiment, the relevant information includes when the sampling is completed. This information can also be transmitted to a connected user device 240 for presentation thereon.

Accordingly, the controller 140 is utilized to receive inputs and generate control outputs that include: duration for collection cycle to run; schedule for collection cycle to run (e.g., start time); speed for the pump motor to run. Controller 140 also generates and outputs display information including: prompts for setting values; run time based on current amp usage; time to start sample collection; run time remaining. Controller 140 also performs the functions for recording or generating and storing a datalog, temperature data, pressure data, time data, start time, stop time, and errors. Controller 140 also enables interfacing with a smartphone, access via a smartphone or online connection to download data, and access to update firmware.

Figure 3A:
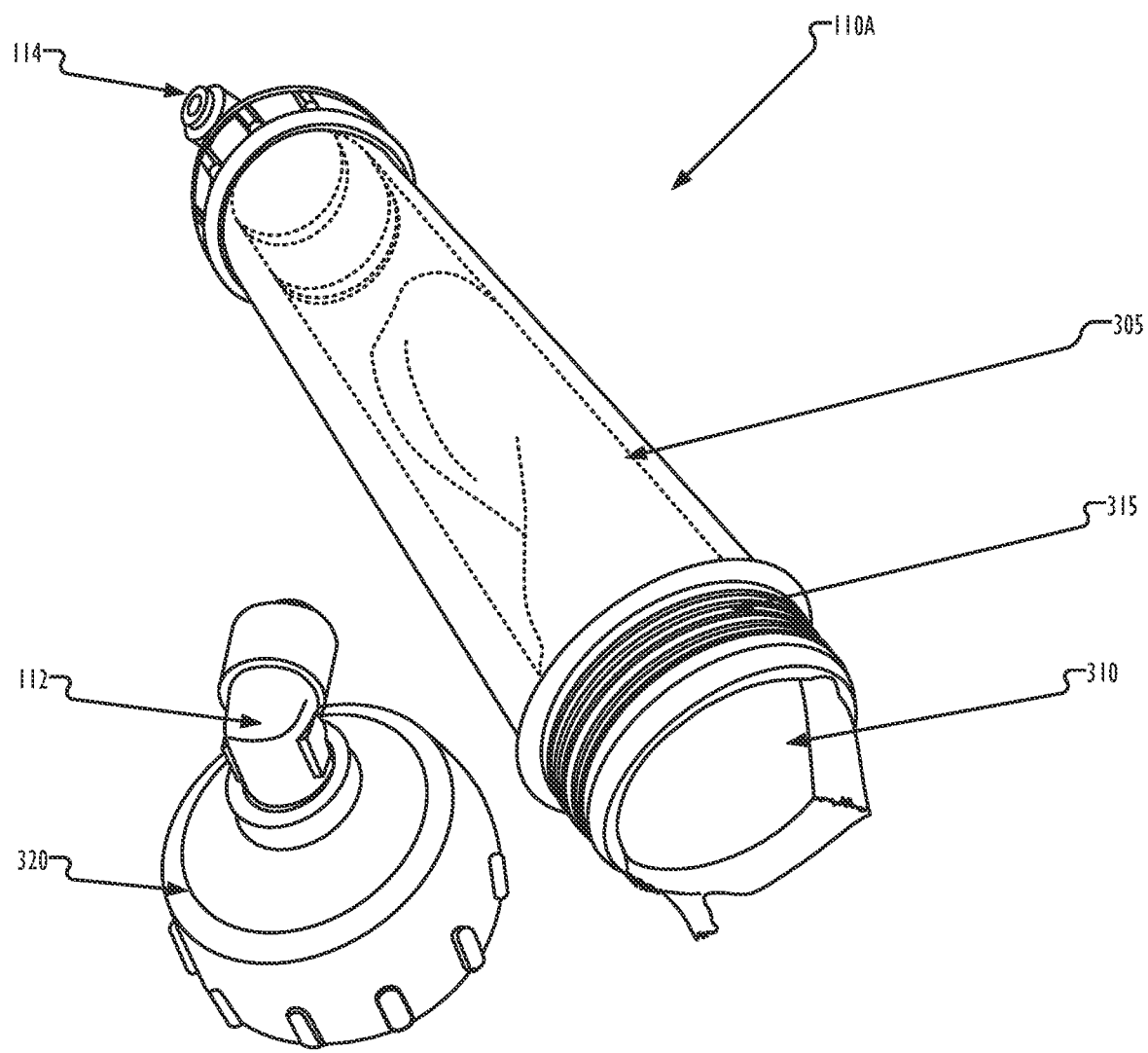
FIGS. 3A-3C presents different views of the solid sample collection filter inside and outside of the filter retaining container (filter cartridge), according to one or more embodiments.
Figure 3C:
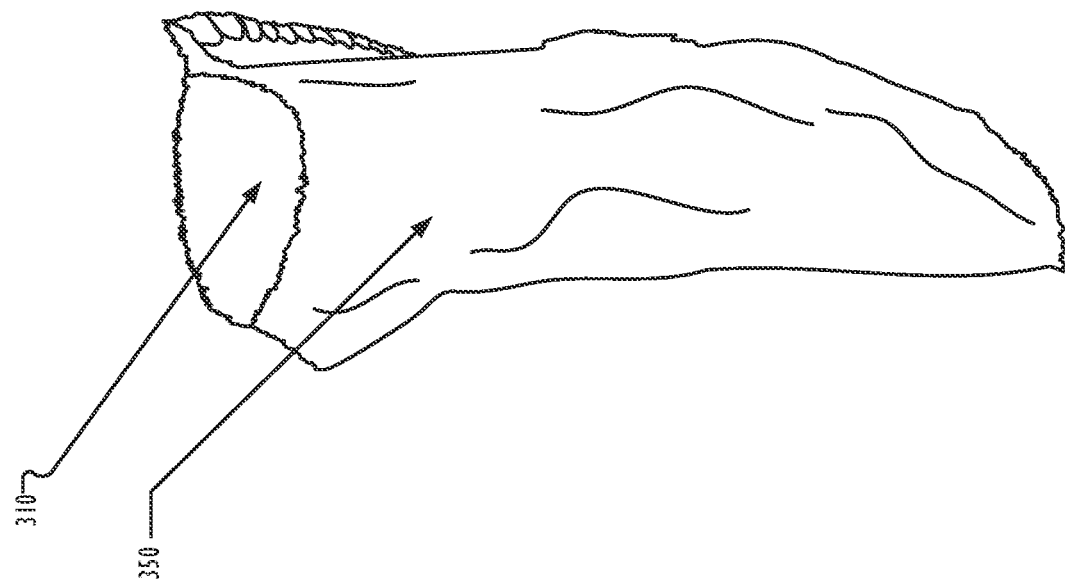
Figure 3B:
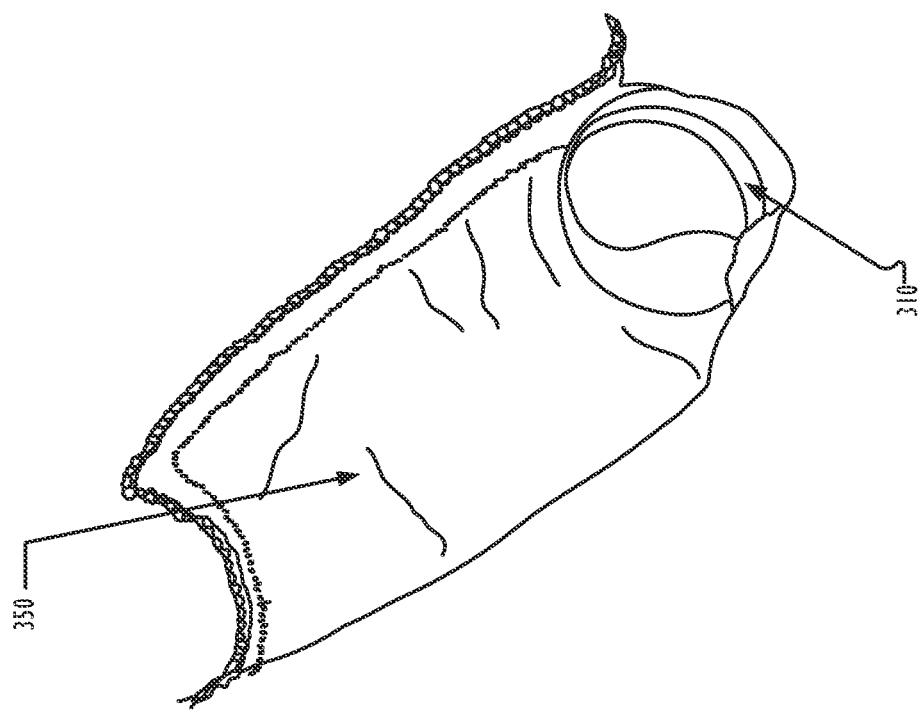

Referring now to FIGS. 3A-3C, there are presented different views of the solid sample collection filter, both inside (FIG. 3A) and outside (FIGS. 3B-3C) of the filter retaining container (filter cartridge) 110A, according to one or more embodiments. All of the later figures are described with ongoing reference to the components and reference numerals within the preceding figures, and in particular FIGS. 1A-1B. According to one embodiment, the container 110 is a solid sample collection container 110 that presents a filter housing. A first end of the intake liquid conduit 120 is connected to the inlet port 112 of the container 110. The container 110 further includes an outlet port 114 that is in fluid connection with an inner volume of the container. The outlet port 114 is further in fluid connection with the inlet connector 132 of the pump 130 via a connecting outlet liquid conduit 116. Intake liquid flows from the inlet port 112 through the container 110 and out the output port 114, suctioned through the inlet connector 132 of the pump 130. The container 110 includes (or houses) a removable filter 155 placed within the inner volume of the container 110 with an open end 310 facing the inlet port 112 and a closed end proximate to the outlet port 114. Intake liquid flows through the filter 155, which removes the solid sample from the liquid medium and retains the solid sample within the filter 155.

According to one embodiment, as shown in FIG. 3A, the container 110 comprises a volumetric body 305 with a threaded opening 315 and a removable cover 320 that sealably fits on top of a receiving end (315) of the volumetric body to create a sealed container volume with the filter 155 placed therein.

Figure 4A:
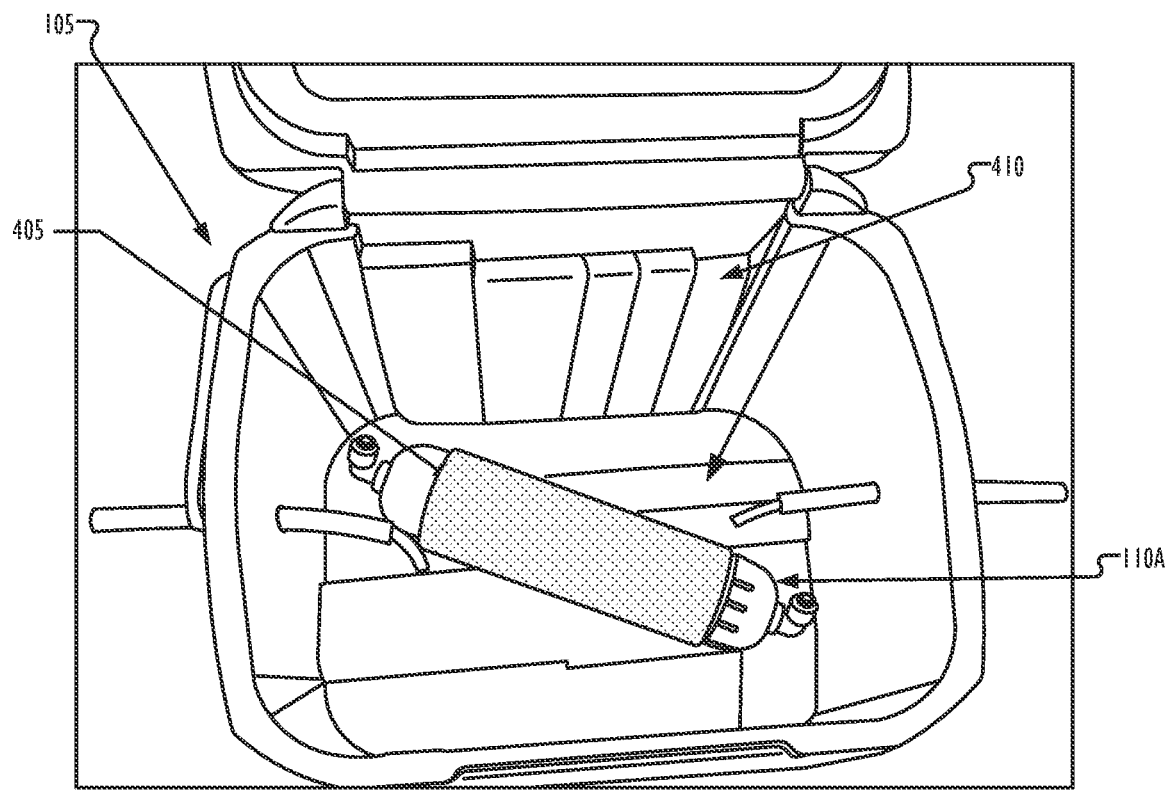
FIGS. 4A-4C illustrates different examples of temperature control mechanisms, including an external sleeve, that can be used to maintain an internal temperature of the container in which the sample is being collected, according to several embodiments.
Figure 4C:
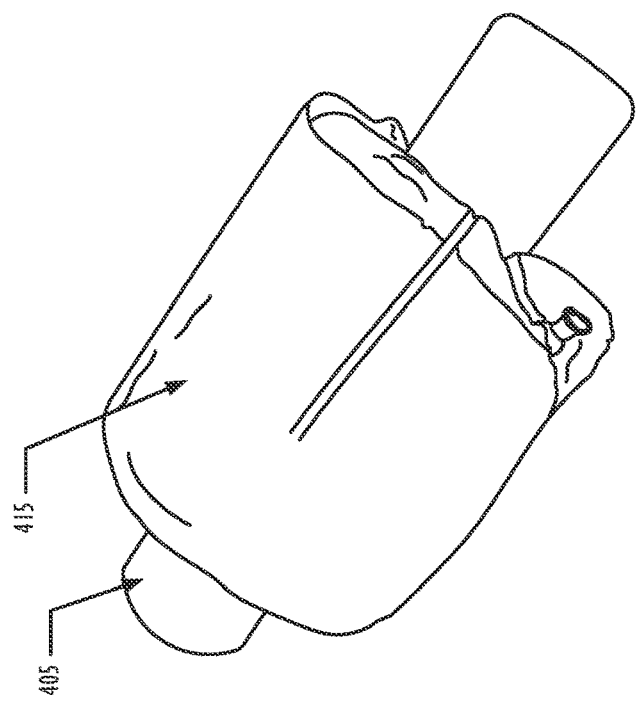
Figure 4B:
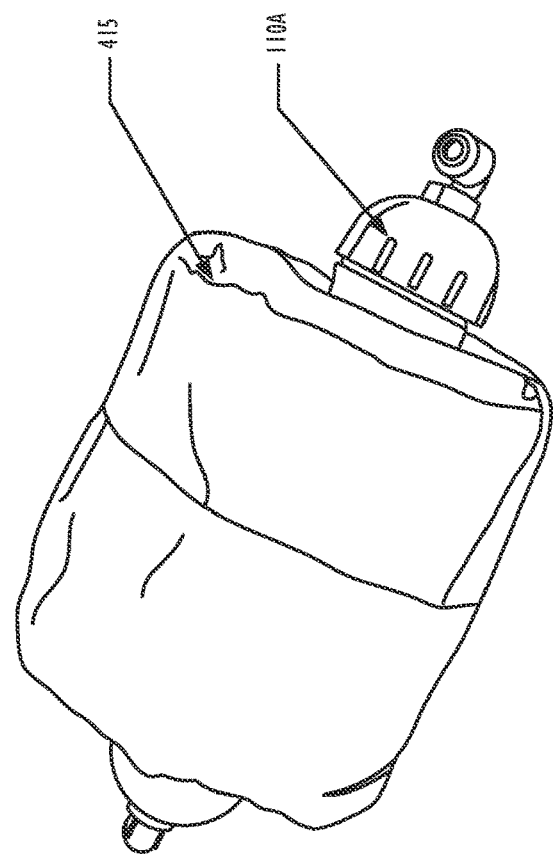

According to one or more aspects, the system 100 further includes a temperature control mechanism (generally for maintaining a temperature of the interior space within the desired temperature range. FIGS. 1A-1B and 4A-4C illustrates different examples of temperature control mechanisms, which can include an external sleeve 160, which can be used to maintain an internal temperature of the container 110 in which the sample is being collected. FIGS. 4A-4C specifically illustrate different examples of different types of sleeves, including a foam insulation sleeve 405 (FIG. 4A), an ice wrap sleeve 415 (FIG. 4B), and a combination sleeve 420 (FIG. 4C) that incorporates both a foam insulation sleeve and the ice wrap sleeve. The illustration of FIG. 4A also presents an example of the interior of the enclosure 105 being interior insulated with insulating blocks 410 to assist with keeping the container 110 at or within a modulated temperature range. In one or more embodiments, the ice wrap sleeve 415 is also referred to as a temperature control sleeve 415. Temperature control sleeve 415 has an inner bore that is circumferentially able to fit around an exterior wall of the container 110. An outer surface of the temperature control sleeve 415 is made with a material capable of retaining a desired temperature range within the sleeve and/or preventing seepage of the cooling components provided within the sleeve. The temperature control sleeve 415 has a body section disposed between the inner bore and the outer surface, within which a cooling method or component is provided to maintain an ambient temperature of contents within the container within a preset temperature range.

Figure 5:
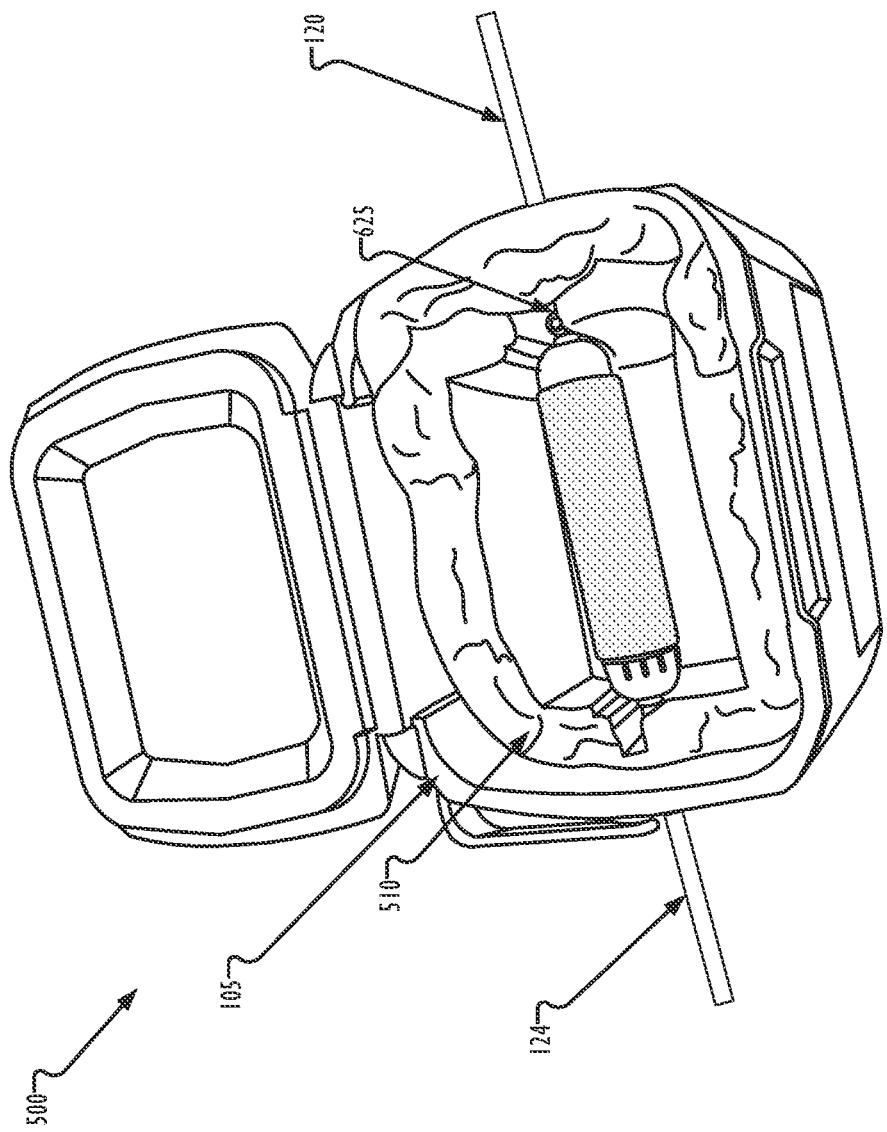
FIGS. 5-7 illustrates different combinations of temperature control mechanisms that include insulation of the interior of the enclosure with insulating blocks and/or spray foam insulation in addition to temperature control sleeves applied to the container, for maintaining the filter cartridge at optimum temperatures during and after a sample collection cycle, according to several different embodiments.
Figure 7:
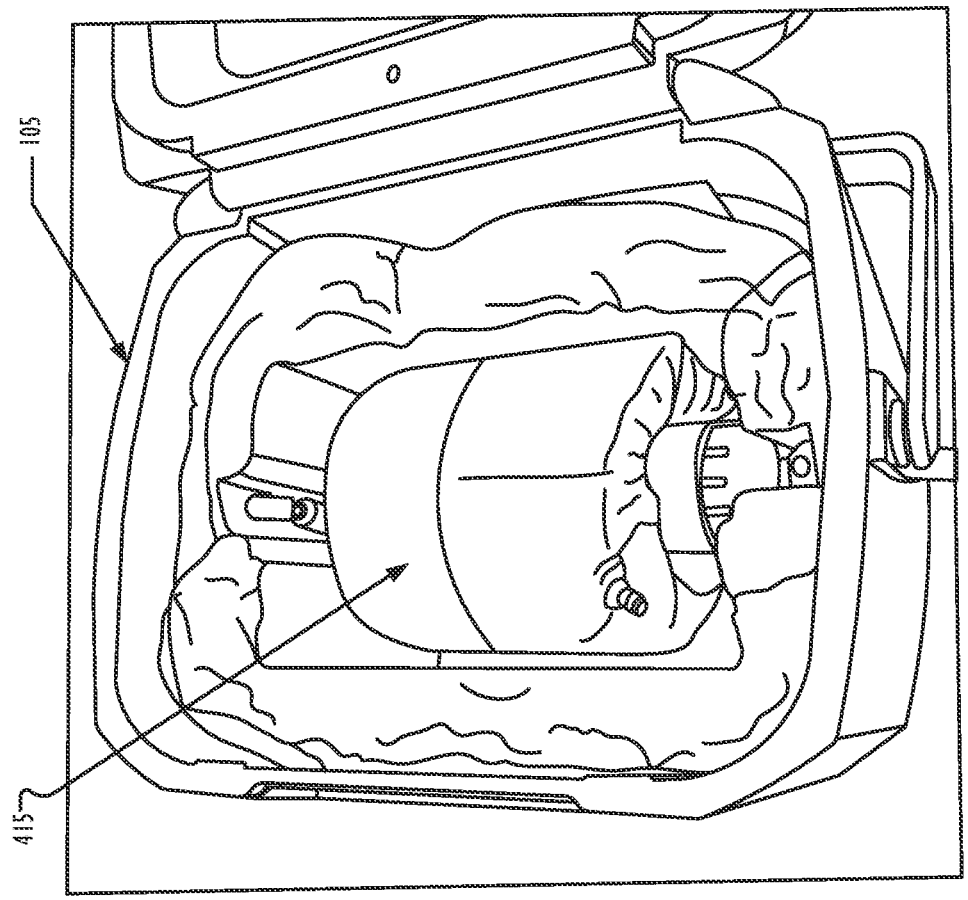
Figure 6:
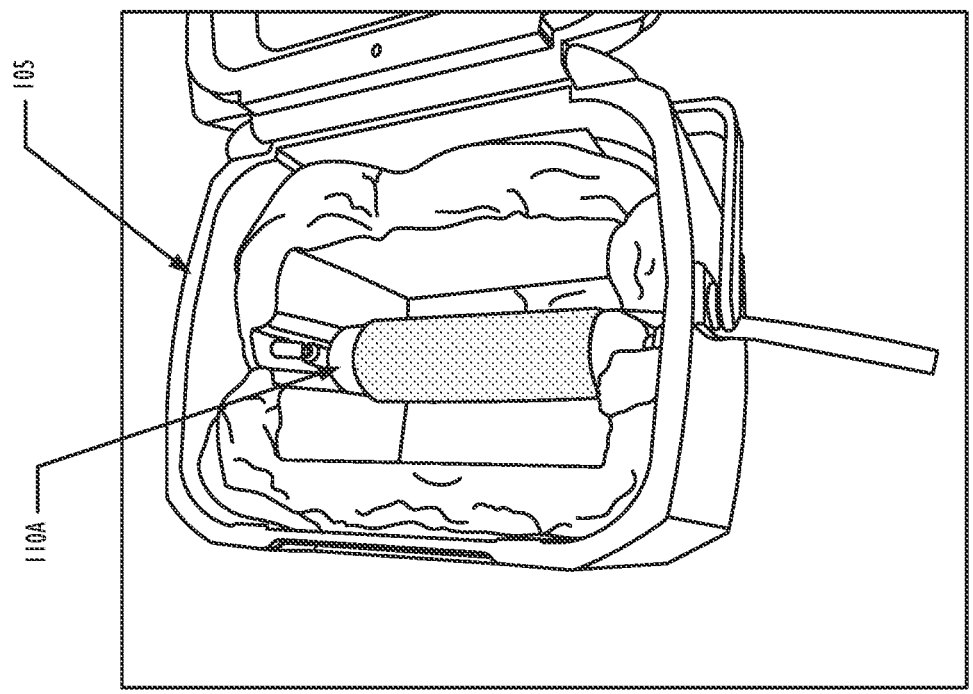

Referring now to FIGS. 5-7, there are illustrated several embodiments of temperature control mechanism including an insulated enclosure 500 that is additionally prepared with secondary temperature control mechanisms (generally 510) within the enclosure. Specifically, FIGS. 5-7 illustrates different combinations of temperature control mechanisms that include insulation of the interior of the enclosure with insulating blocks and/or spray foam insulation in addition to temperature control sleeves applied to the container, for maintaining the filter cartridge at optimum temperatures during and after a sample collection cycle. With the enclosure 105 having an insulated exterior wall, one embodiment allows for the use of regular ice for maintaining the temperature of the collected samples.

Several of the temperature control mechanisms 510 are prepared and utilized to cool the container 110 in order to maintain the temperature of the collected sample within a particular temperature range, according to one or more embodiments. The temperature control mechanism (510) thus includes one or more of: an insulated exterior wall, a padding of insulated foam or other insulated material within the interior space and surrounding the container, a mechanical cooling source inside of the interior space, a mechanical cooling source outside the enclosure and in fluid connection with the interior space, physical ice placed within the interior space, and a temperature control sleeve surrounding the container. The mechanical cooling source can be some type of refrigerator or cooling unit that generates cooling air that is provided within the enclosure 105.

Figure 8:
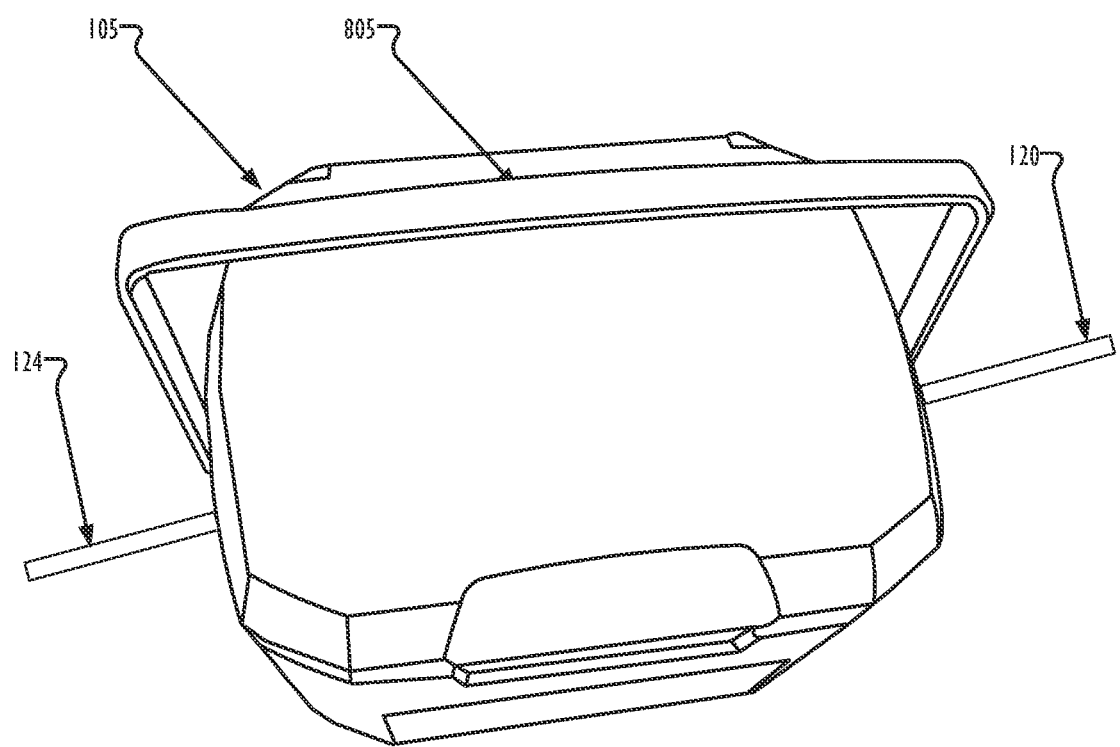
FIG. 8 illustrates an example temperature-moderating enclosure housing the container, with an intake liquid conduit and an outlet liquid conduit extending from exterior walls to respectively provide a flow of liquid being sampled into and out of the temperate-moderating enclosure housing the sample collection container, according to one or more embodiments.

With reference to FIG. 8, there is illustrated an example temperature-moderating enclosure 105 housing the container 110, according to one or more embodiments. In one embodiment, the temperate-moderating enclosure 105 is an insulated container having sufficient interior space to house the container 110 and the additional temperature control mechanisms employed. Example temperature-moderating enclosure 105 presents an intake liquid conduit 120 and an outlet liquid conduit 124 extending from exterior walls of the enclosure 105 to respectively provide a flow of liquid being sampled into and out of the temperature-moderating enclosure 105 housing the sample collection container, according to one or more embodiments. Temperature-moderating enclosure 105 includes a handle 805 that enables the enclosure to be carried by a person and thus "portable".

Figure 9A:
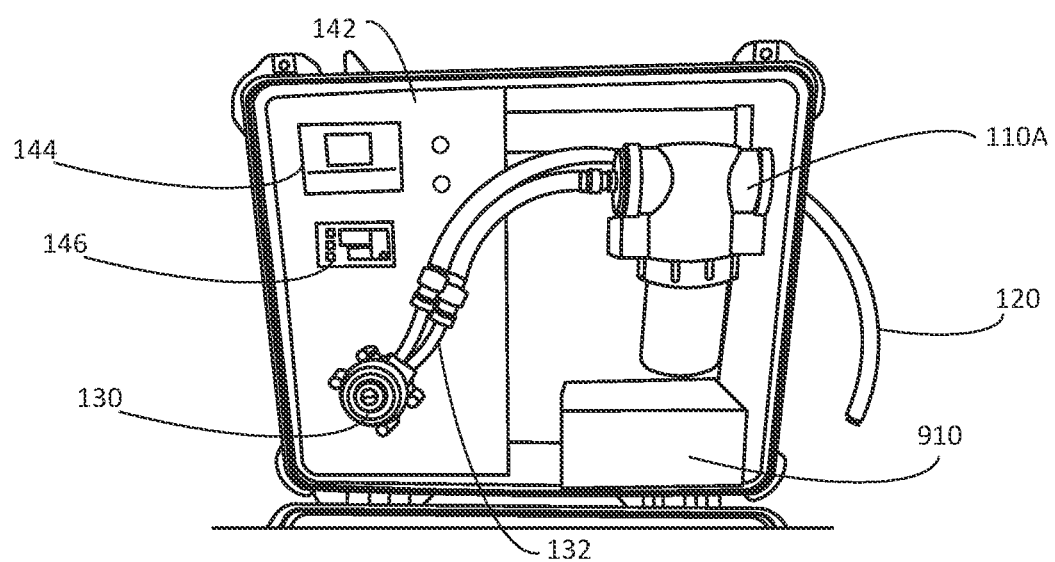
FIGS. 9A-9B presents different internal views of a different configuration of the sample collection system presenting an integrated, all-in-one configuration of control board and pump and battery, with the pump in fluid connection with the collecting container, all within a portable enclosure, according to one or more embodiments.
Figure 9B:
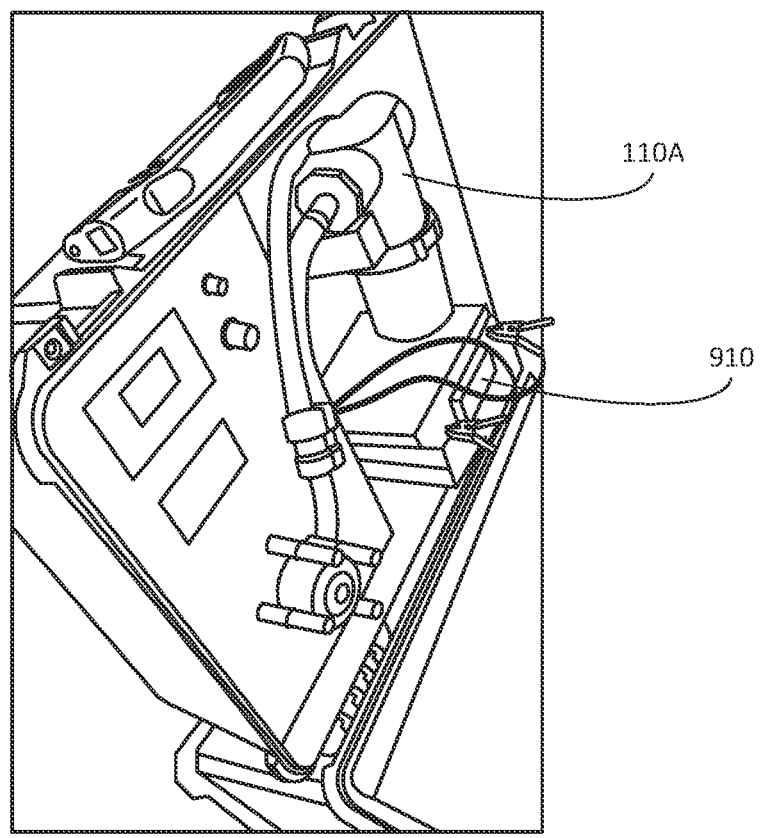

Another aspect of the disclosure provides an apparatus for collecting samples from a liquid source. FIGS. 9A-9B presents different internal views of a different configuration of the sample collection apparatus 900 presenting an integrated, all-in-one configuration of control board and pump and battery, with the pump in fluid connection with the collecting container, all within a portable enclosure, according to one or more embodiments. Because the apparatus 900 represents one embodiment incorporating portions of the system of FIG. 1A into a single enclosure, like reference numerals are used for like components. The apparatus 900 includes a container 110 having an interior volume surrounded by exterior walls with at least one inlet for receiving an intake liquid flow comprising a sample being collected within the container. The apparatus 900 includes an intake liquid conduit 120 having a first end in fluid connection with and extending from the at least one inlet of the container 110 and having a second end opposed to the first end. The intake liquid conduit 120 is extendable to have the second end submerged into a liquid source (150) from which the sample is being collected. The apparatus 900 includes a pump 130 having an inlet connector 132 in fluid connection with the intake liquid conduit 120 to suction intake liquid flow from the liquid source 150. The pump 130 is a programmable variable speed pump that can provided different amounts of suction force on intake liquid within the intake liquid conduit 120 to control a rate of flow of the intake liquid. The apparatus 900 includes a controller (140, generally provided in FIG. 9A as a part of the controller board 142) that is communicatively coupled to an electrical motor (135) of the pump (140). The controller (140) receives inputs identifying an amount of the sample to be collected and a length of time for collecting the sample. The controller (140) calculates a pump speed of the pump 130 that will cause the pump 130 to operate and collect the amount of the sample. The calculation is based on retrieved and received data, from among pump speed calculation data that includes characteristics of the pump, the amount of the sample to be collected, and the length of time. The controller (140) transmits, to the electrical motor 135 of the pump 130, a pump activation signal 250 that includes the pump speed and length of time. The pump activation signal 250 activates the pump to initiate suction at the inlet connector 132. The pump 130 suctions the intake liquid at a flow rate that allows continuous sampling of the liquid source over an entirety of the length of time. According to one embodiment, in calculating the pump speed, the controller (140) calculates revolutions per minute (RPMs) of a rotating impeller (135) of the pump 130. The apparatus 900 includes a battery 910 that serves to provide power to each of the electrical components (e.g., the controller (140) and the pump 130) that require power to operate.

Figure 10A:
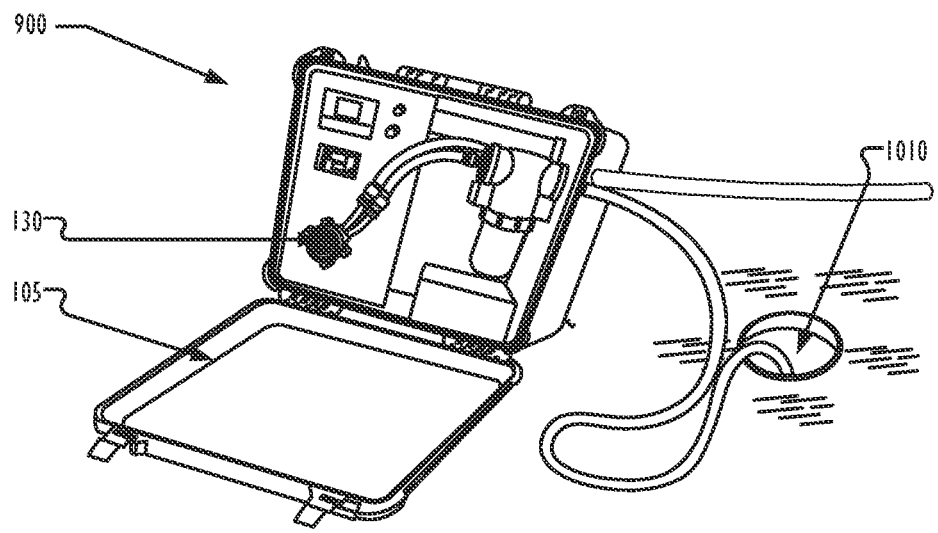
FIGS. 10A-10B illustrate the sample collection system of FIGS. 9A-9B being used in the field to collect samples from a localized sewer system, according to one or more embodiments.
Figure 10B:
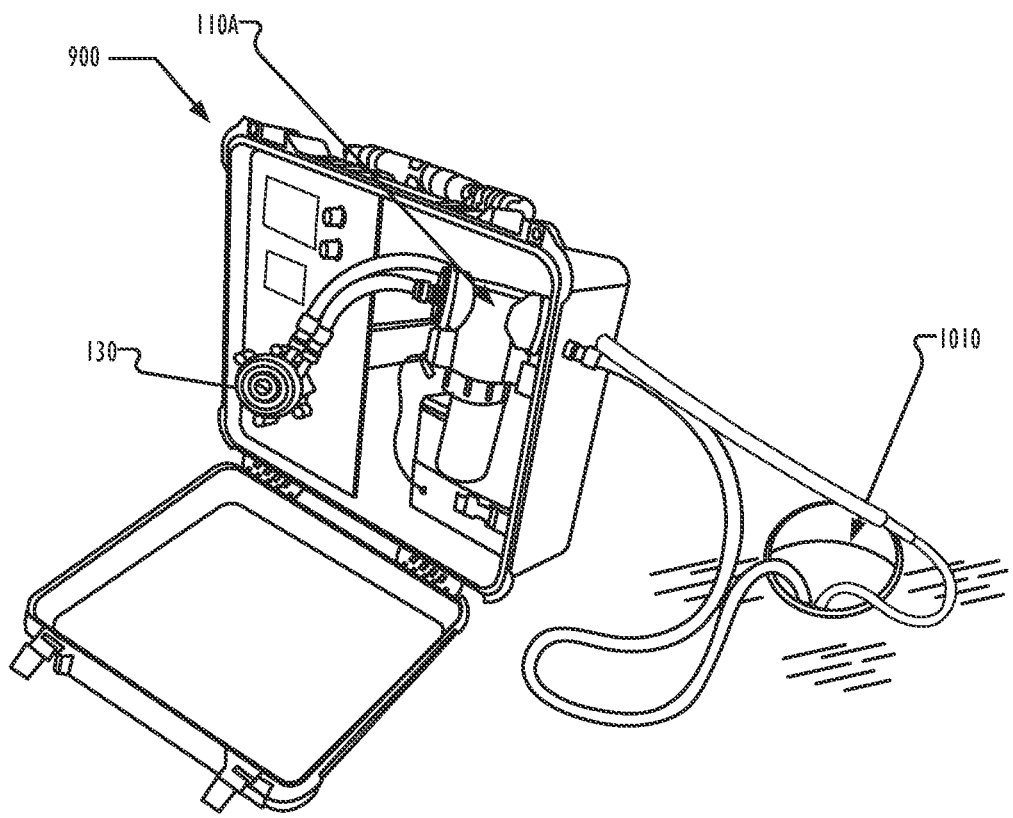

FIGS. 10A-10B illustrate the sample collection apparatus 900 of FIGS. 9A-9B being used in the field to collect samples from a localized sewer system, according to one or more embodiments. As shown, a length of the intake collecting conduit 120 is placed down an uncovered sewer access hole 1010 to enable collection of the liquid sample.

Figure 11B:
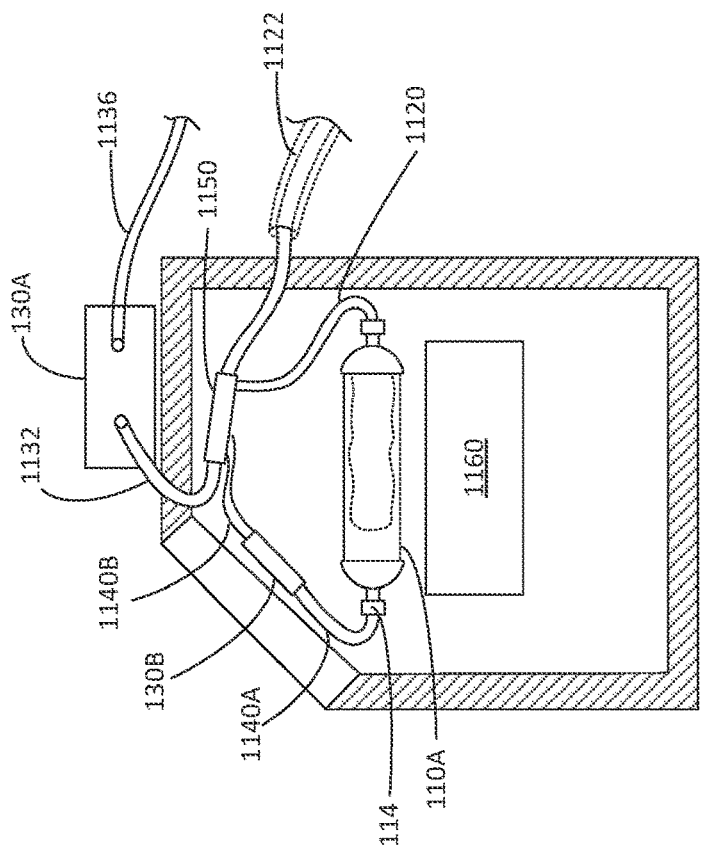
FIGS. 11A and 11B respectively illustrate a single pump and a dual pump implementation of the solid sample collection system, which integrates different types of temperature moderating mechanisms during and after sample collection, according to multiple embodiments.
Figure 11A:
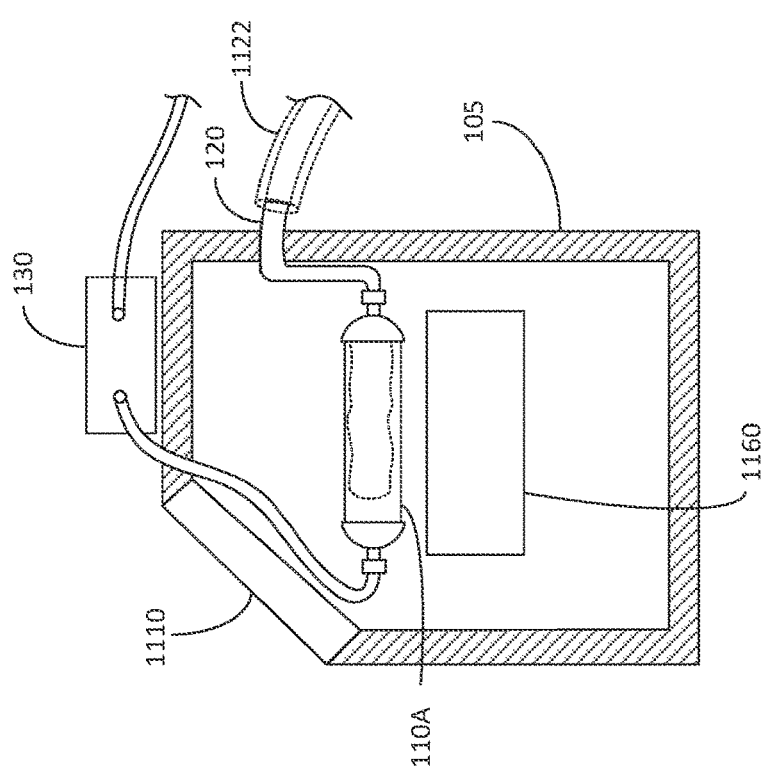

FIGS. 11A and 11B respectively illustrate a single pump and a dual pump implementation of the solid sample collection system, which integrates different types of temperature moderating mechanisms for during and after sample collection, according to multiple embodiments. The embodiment of FIG. 11A operates similarly to those of the preceding figures with the single pump 130 located generally outside of (and specifically on top of) the enclosure 105. Enclosure 105 includes thick insulated exterior walls and an access panel 1110, shown in the closed position. Solid sample collection container 110A is placed inside of enclosure and is configured to operates similarly to the preceding descriptions (see FIG. 1A and description thereof). Enclosure also includes one or more temperature control mechanisms 1160, as previously described and illustrated with FIGS. 4A-7.

Referring now to the dual pump embodiment of FIG. 11B, with ongoing reference to the descriptions of the features from FIGS. 1A. Similar to FIG. 11A, the container 110 is a solid sample collection container 110A that presents a filter housing. However, different from the embodiment of FIG. 11A, the system includes two pumps, primary pump 130A and secondary pump 130B. Primary pump 130A has a first intake port 1132 in fluid connection with the intake liquid conduit 120 and primary pump 130A suctions, via the first intake port 1132 and intake liquid conduit 120, a larger volume of liquid into the interior space of the enclosure than required for sample collection. The primary pump 130A is thus used to enable the sample collection to occur within a desired temperature range provided within the interior space, preventing the intake liquid from freezing or being overheated by the exterior conditions (i.e., conditions outside the temperature-controlled enclosure).

According to one or more embodiments, the intake liquid conduit 120 includes (or is covered with) an exterior shield (1122, FIGS. 11A-11B and 12A-12B) of insulating material to minimize exterior heating and cooling on the liquid flowing into the interior space through an exposed section of the intake liquid conduit. Also, the intake liquid flow is maintained at an ambient temperature of the interior space, while the sample is being collected.

A secondary pump 130B that is located within the interior space of the enclosure 105 pulls sample liquid into or through the container 110A. The intake liquid conduit 120 is fed into a conduit connector 1150 which has a second intake liquid conduit 1120 coupled thereto. The second intake liquid conduit 1120 extends from the conduit connector 1150 and is coupled to the at least one inlet port (112) of the container 110A. With this embodiment, the container 110A further includes an outlet port 114 that is in fluid connection with an inner volume of the container 110A. The outlet port 114 is further in fluid connection with the inlet connector 132 of the secondary pump 130B via an outlet liquid conduit 1140A connected to the outlet port. Intake liquid flows from the inlet port 112 through the container 110A and out the output port 114, suctioned through the inlet connector (not shown) of the secondary pump 130B. The container 110A further includes a removable filter placed within the inner volume of the container 110A with an open end facing the inlet port 112 and a closed end proximate to the outlet port 114. Intake liquid flows through the filter, which removes the solid sample from a liquid medium and retains the solid sample within the filter.

The primary pump 130A also has a first outlet in fluid connection with a first outlet liquid conduit 1134 that enables expulsion of non-collected liquid (i.e., liquid not retained within the container 110) out of the system. The primary pump 1130A is communicatively connected to the controller (140) and receive control inputs from the controller (140). The system also includes a second outlet liquid conduit 1140 with a first end in fluid connection to the outlet connector (not shown) of the secondary pump 130B and a second end in fluid connection to the conduit connector 1150, upstream of the flow of liquid within the conduit connector 1150, relative to the second intake liquid conduit 1120. The controller (140) triggers the primary pump 130A to operate at a rate that suctions the larger volume of liquid through the intake liquid conduit 120, and the controller further triggers the secondary pump 1130B to operate at a rate that only suctions as much of the liquid sample from within the conduit connector 1150 (or intake liquid conduit 120) as required to collect the solid sample with the removable filter within the container 110A.

Figure 12B:
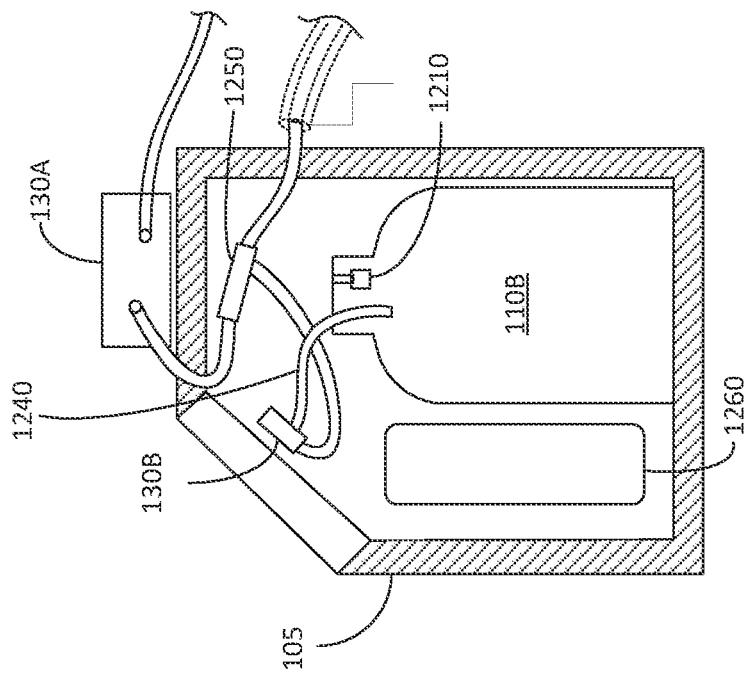
FIGS. 12A and 12B respectively illustrate a single pump and a dual pump implementation of the liquid sample collection system, which integrates different types of temperature moderating mechanisms during and after sample collection, according to multiple embodiments.
Figure 12A:
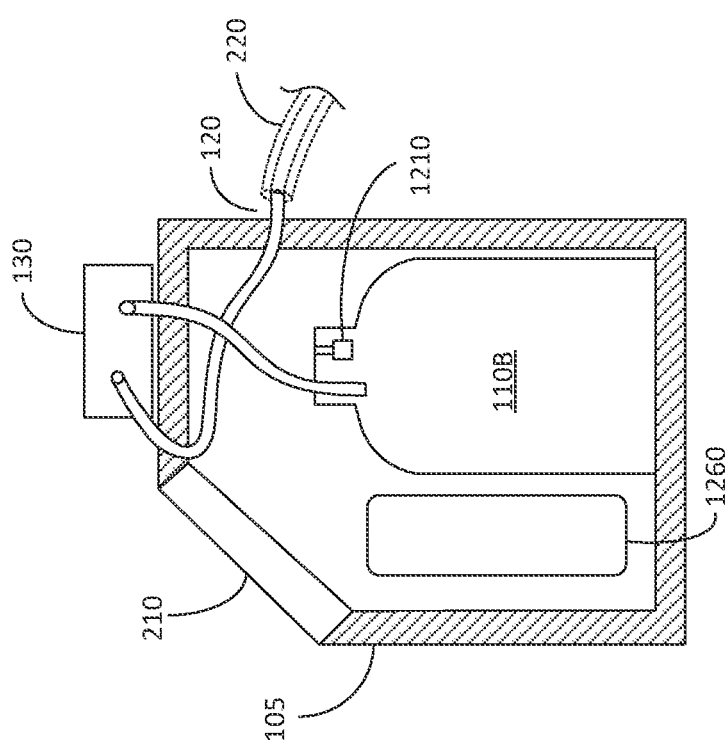

FIGS. 12A and 12B respectively illustrate a single pump and a dual pump implementation of a liquid sample collection system, which integrates different types of temperature moderating mechanisms for during and after sample collection, according to multiple embodiments. Unlike the solid sample collection systems of the previously described figures, the liquid sample collection systems retain a portion of the liquid flow as the sample within upright, volumetric containers. Looking first at FIG. 12A, the container (generally 110) is a volumetric liquid sample collection container 110B that retains the intake liquid sample. The intake liquid conduit 120 is in fluid connection with the intake connector (not shown) of the pump 130, and the system further includes an outlet liquid conduit 1240 with a first end in fluid connection to the outlet connector (not shown) of the pump 130 and a second end terminating inside of the liquid sample collection container 110B. The controller (140) programs the pump 130 to operate at a rate that only suctions as much of the liquid sample as can be stored within the liquid sample collection container 110B. A container overflow sensor 1210 is provided to sense when the amount of liquid reaches the full capacity of the liquid sample collection container 110B.

FIG. 12B presents a dual pump implementation of the liquid sample (continuous) collection system. As with FIG. 12A, the container (110) is an upright, volumetric liquid sample collection container 110B that retains the intake liquid sample. The system includes a primary pump 130A having a first intake port in fluid connection with the intake liquid conduit 120 and which suctions, via the first intake port and the intake liquid conduit, a larger volume of liquid into the interior space of the enclosure than required for sample collection, to enable the actual sample collection by a secondary pump 130B to occur within a desired temperature range of the interior space. The secondary pump 130B is located within the interior space of the enclosure 105. The intake liquid conduit 120 terminates into a conduit connector 1250 with a second intake liquid conduit 1220 in fluid connection thereto, to fluidly connect with the intake connector of the secondary pump 130B. The primary pump 130A also has a first outlet in fluid connection with a first outlet liquid conduit 1136 that enables expulsion of non-collected liquid out of the system. The primary pump 130A is communicatively coupled to the controller (140) and receives control inputs from the controller (140). The system further includes a second outlet liquid conduit 1140B with a first end in fluid connection to the outlet connector (not shown) of the secondary pump 130B and a second end terminating inside of the liquid sample collection container 110B. The controller (140) triggers the primary pump 130A to operate at a rate that suctions the larger volume of liquid through the intake liquid conduit, and the controller (140) further triggers the secondary pump 130B to operate at a rate that only suctions as much liquid sample from within the intake liquid conduit as can be stored within the liquid sample collection container 110B. Enclosure 105 also includes one or more temperature control mechanisms 1260, as previously described and illustrated with FIGS. 4A-7.

Figure 13:
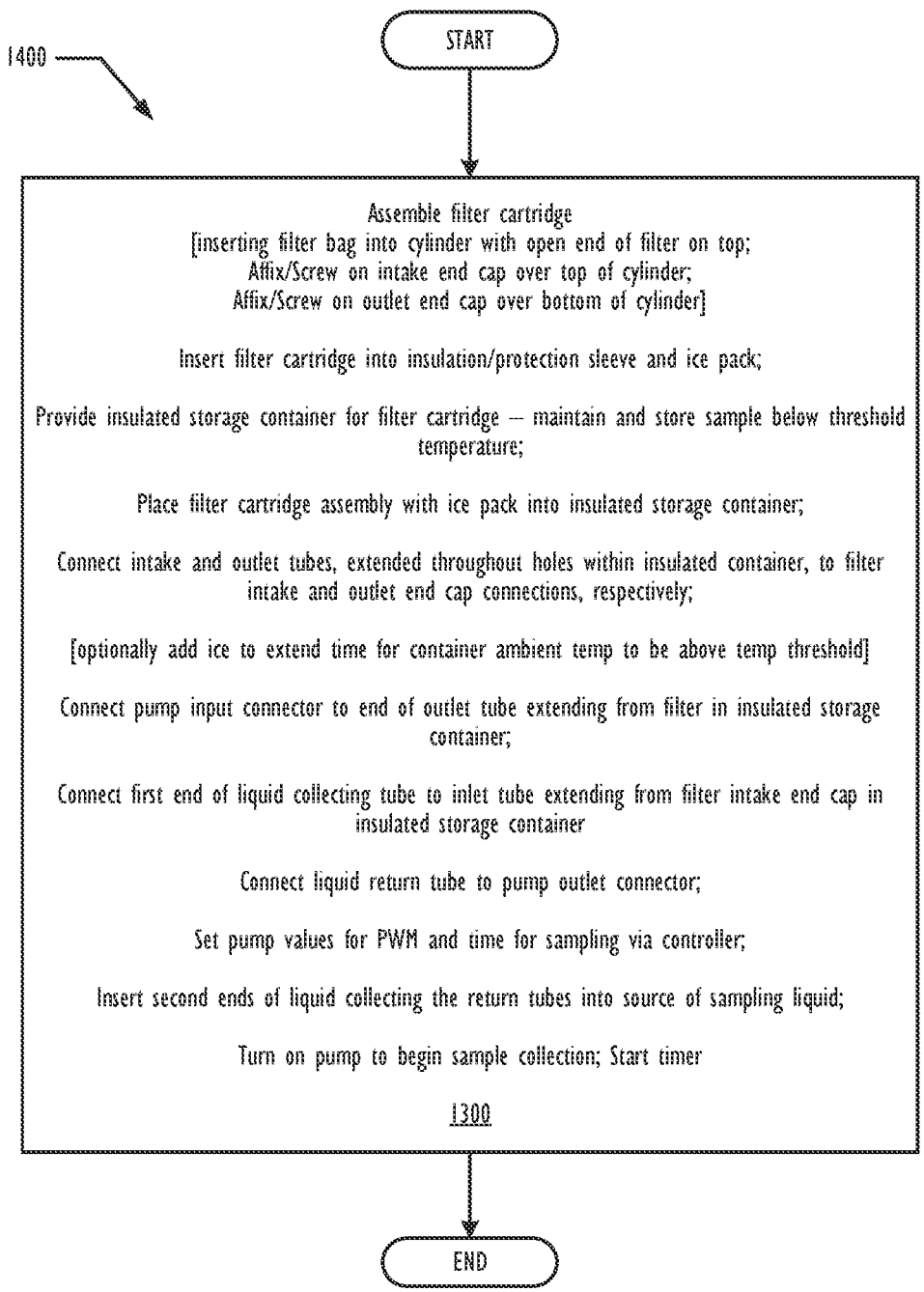
FIG. 13 illustrates a process diagram presenting the various steps involved in assembling and utilizing the sample collection system of the present disclosure, according to one or more embodiments.

FIG. 13 illustrates a process diagram 1300 presenting various steps involved in assembling and utilizing the sample collection system of the present disclosure, according to one or more embodiments.

Figure 14:
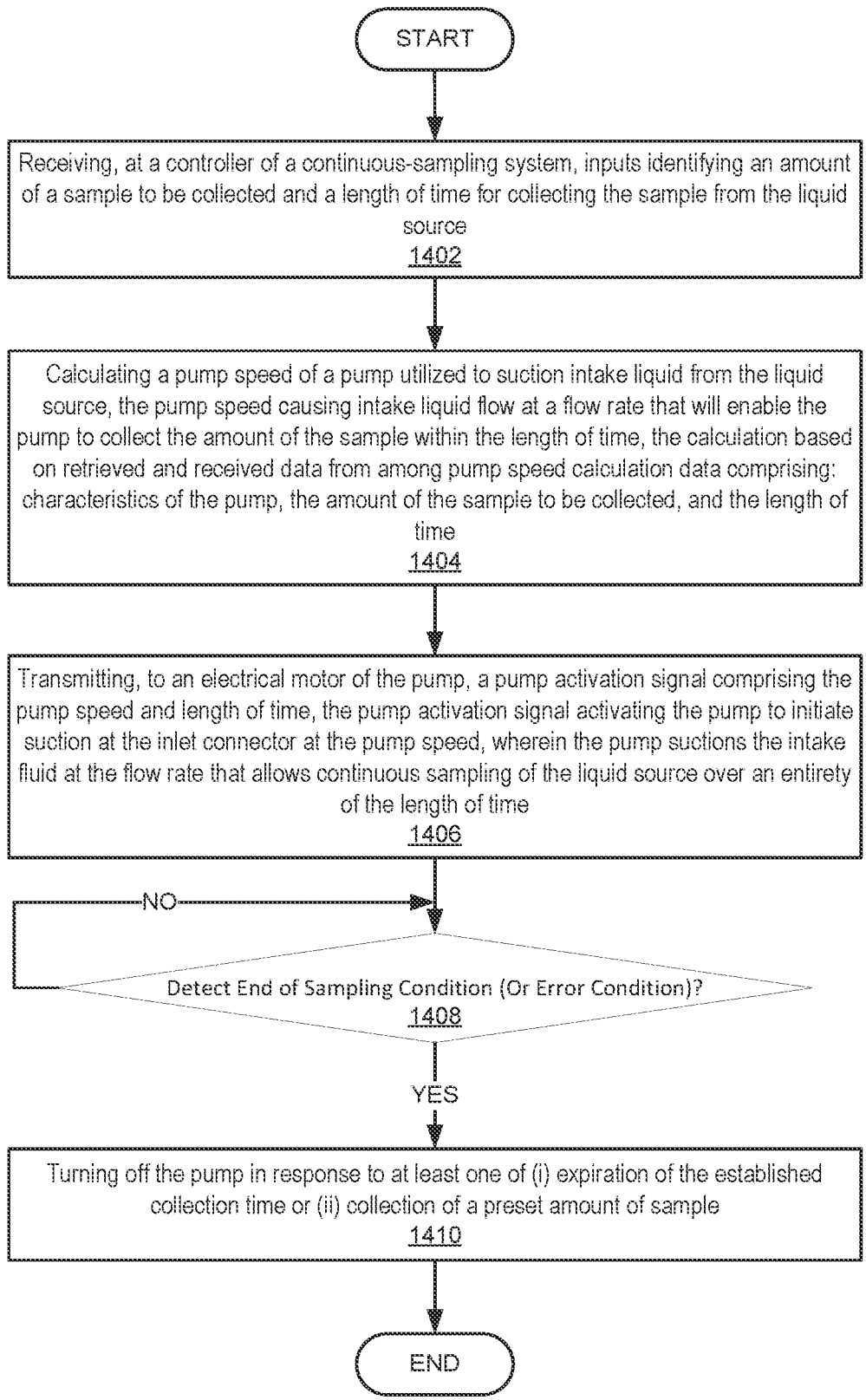
FIG. 14 provides a method by which the controller controls the pump speed to enable the sample collection system to collect a desired amount of sample using a continuous sampling period and adjustable flow rate, according to one or more embodiments.

FIG. 14 provides a method by which the controller 140 of the sample collection system 100 controls the pump speed and length of time to enable the sample collection system 100 to collect a desired amount of sample from a liquid source, using a continuous sampling period and adjustable flow rate, according to one or more embodiments. Certain aspects of the method 1400 are autonomously completed via processing of program code by a microprocessor of controller 140, as presented in the description of FIG. 2. For simplicity, the method processes are described as if performed generally by controller 140 rather than the individual components within controller 140. Beginning from the start block, method 1400 includes receiving, at a controller of a continuous-sampling system, inputs identifying an amount of a sample to be collected and a length of time for collecting the sample from the liquid source (block 1402). Method 1400 includes calculating a pump speed of a pump utilized to suction intake liquid from the liquid source (block 1404). According to one aspect, the pump speed causes intake liquid flow at a flow rate that will enable the pump to collect the amount of the sample specimen within the length of time. The calculation is based on retrieved and received data from among pump speed calculation data that includes characteristics of the pump, the amount of the sample to be collected, and the length of time. Method 1400 includes transmitting, to an electrical motor of the pump, a pump activation signal comprising the pump speed and length of time, the pump activation signal activating the pump to initiate suction at the inlet connector at the pump speed (block 1406). Accordingly, the pump suctions the intake fluid at the flow rate that allows continuous sampling of the liquid source over an entirety of the length of time. The method further includes determining (at decision block 1408) whether one of two end of sampling conditions or an error has occurred. Method 1400 then includes turning off the pump in response to at least one of (i) expiration of the preset collection time or (ii) collection of a preset amount of sample (block 1410). Method 1400 then ends.

According to one embodiment, the method 1400 further includes monitoring, via a pressure sensor communicatively connected to the controller, a pressure reading corresponding to an amount of pressure sensed at a filter used to collect solid samples from the intake liquid. The method also includes dynamically modifying a flow rate of the pump based on the pressure reading.

According to another embodiment, the method 1400 further includes receiving, via a wireless receiver from a flow rate sensor, a flow rate of the liquid source, the flow rate sensor communicatively connected to the controller via the wireless receiver, the flow rate sensor submerged within the liquid source at a location proximate to the intake end of the intake liquid conduit. The method 1400 includes dynamically adjusting an operating speed of the pump, in part based on the flow rate of the liquid source.

According to one embodiment, the method 1400 further includes wirelessly connecting, via a wireless transceiver, to a user device and transmitting, to the user device, one or more signals and data from among process status data, error signals, and collection completion signals.

Unlike traditional fluid collection with wastewater, which utilizes a periodic sampling and generalized extrapolation to yield composite data, the present disclosure samples continuously over a set sampling time period, with continuous solid or liquid sample collection. According to one aspect, the SSC system is an assembly of multiple components including a filter cartridge having an intake and an outlet connector for attaching respectively to an intake line and an outlet line. The filter cartridge has included therein a fabric filter configured as a volumetric bag enclosed at one end and sealed along the sides, with a top end held open by a ring or annulus proximate to the intake side of the filter compartment.

According to one or more embodiments, the filter component incudes a central cylindrically shaped liquid conduit having an inner volumetric space for housing the filter cartridge. The central liquid conduit is non-porous and can be made from plastic, glass, or other non-porous material. Each of the top and bottom of the liquid conduit provides circumferential grooves of male threading to enable an end cap to be screwed onto the respective end and create a sealed, closed filter component. The end caps are designed with corresponding female threading that screwably attached the end caps onto the ends of the liquid conduit. Extended from the top of the end cap is an L-shaped PVC (or metal) fitting sealably connected to the end cap and in fluid connection with an internal volume of the cylinder. The connected fitting includes a screwable or insertable end to which a collection/intake liquid conduit can be attached. The screwable end can provide a female or male thread to mate with an opposed male or female end connector placed on the collection/intake liquid conduit. It is appreciated that different types of connections may be provided or supported in other embodiments of the SSC system, that allow for a seal to the collection liquid conduit to be secure and durable. The intake line and outlet lines are liquid conduits, made of rubber or plastic, that are long enough to extend outside of the holding compartment for the filter cartridge for connecting to one or more of the pump intake connector and an extended intake line that can be inserted into a water/liquid source containing the liquid to be sampled.

In one embodiment, the filter is made of a permeable material, and is capable of filtering at the level of 100 microns. The top of the filter is open and includes an annulus or ring made of semi-rigid rubber to keep the top open when the filter is placed inside the cartridge. The dimension of the annulus or ring is sized to enable insertion of the bottom of the filter into the tubular compartment while the top sits aligned with an upper perimeter surface of the cylinder. The end cap then secures the filter in place once screwed onto the threads of the cylinder.

The RSSC system also includes a variable speed pump, whose PWM can be adjusted based on an amount of liquid flow and/or sample collection desired. The pump includes a motor and an inlet through which wastewater is sucked into the pump through the filter cartridge. The pump also includes an outlet through which the wastewater exits the pump. The inlet is in fluid connection with the inside of the filter compartment via an inlet connector or liquid conduit, while the outlet is in fluid connection with the outside return line. One of a battery pack, a battery, or a stand-alone power supply is provided to power the pump during operation thereof.

The pump is electrically connected to a controller configured within a controller board that includes a power on/off button or switch, a rotatable PWM knob for controlling or setting a pump speed, and a timer. The electronic components of the controller can be separately powered or be powered by the same power supply as the pump. The controller is programmed with details about the length of time for running the pump to complete collection of the sample and a PWM of the pump to enable a substantially efficient sample collection without over pressurizing the filter compartment.

In one embodiment, the SSC system is housed or enclosed within a single casing that includes a base compartment and a cover section. The pump and filter cartridge are enclosed within the casing when the cover section is in a closed position relative to the base compartment. At least one latching mechanism is provided within the cover section or base compartment to allow for closing and securing the casing to protect from external access. Additionally, in one embodiment, the interior of the casing walls is insulated to allow for protection against humidity and to prevent heating of the collected sample above a desired maximum threshold value.

In at least one embodiment, the filter cartridge is placed within a protection/insulated sleeve and the combination of the cartridge and sleeve are then inserted within an exterior ice pack that is configured to insertably hold the filter cartridge and provide constant cooling to the interior of the filter cartridge and, by extension, the collected samples. This assembly, collectively referred to as a cooling sleeve, provides a wall of ice or cooling material surrounding the filter component. The collected sample is thus maintained at a temperature below a threshold temperature to keep the samples viable while the SSC system is left out in the field collecting the sample.

In an alternate embodiment, the cooling is provided by inserting regular ice around the filter within an insulated container. The insulated container has an insulated exterior casing that is configured (e.g., by drilling into the side walls) with at least two holes (e.g., on opposed sides of the container) to provide an inlet and an outlet bore/hole for respectively passing the inlet and outlet liquid conduits through from outside the container to the interior of the container to connect to the inlet and outlet of the filter cartridge being housed within the container. The insulated container can be further insulated using insulated blocks or a spray foam, in alternate embodiments. With these embodiments, the controller system and pump can be provided in a separate casing, and the intake of the pump is fluidly connected to the outlet of the filter cartridge via the outlet liquid conduit extending outside of the insulated container.

According to one aspect, the collection by the SSC system occurs over a period of 24-36 hours. The actual time may vary depending on factors such as type of sample, source, location, etc., and the time can be programmed into the controller (or updated) by the engineer/technician in the field. Liquid flows into the inlet valve in the intake end cap of the filter cartridge and into the open end of filter. The liquid is pulled through the outlet end cap out of the filter by the pump. The liquid passes through the filter, depositing solid sediments within the filter material. The liquid at the pump is then pushed out of the pump back to the source of the intake liquid. It is appreciated that in some embodiments, the liquid can be sent to a different location than the source of the intake liquid. For example, the outlet can be to a surface drain or a retention area, etc. Alternatively, the outlet liquid conduit can be provided downstream of the fluid flow to prevent resampling of already sampled fluid. The amount of liquid flow is based on the PWM level set for the pump, which can be determined by empirical analysis, factoring in the size of the filter, amount of sample desired, time frame for completing the collection, and other factors.

Accordingly, in one embodiment, the SSC system includes a mechanism for moving fluid, such as a pump, a controller that enables both speed control and duration control. A timer used to track the duration. A sample filtering chamber that is removable and self-sealing. The SSC system also includes a back pressure sensor and a flex strainer. The RPM allows the pump to turn at a rate required to provide the volume desired over a preset time. In one embodiment, fluid sensors are provided to determine the volume of liquid flow per second at the collection site. In one or more embodiments, dual lasers are utilized to shoot a light through a glass conduit in order to yield a time per distance for the calculation of the liquid flow rate and volume.

The disclosure envisions use of the SSC system with other RNA, which use would depend on what was being targeted and whether the target specimen occurs in the urine or the feces. For urine, filters specific to that RNA could be used to capture the samples. A bottle could be used with the stream going into the bottle, with a constant stream controlled by the pump to allow a flow level to fill the bottle over the extended sampling period.

As provided above, the design and implementation features of the disclosure provides an apparatus, a system, and a method for obtaining solids from wastewater to be tested for COVID-19 and/or similar diseases that are excreted by humans (or animals) within feces or urine that is deposited within the wastewater. The pump pulls the source fluid out from the source location, which can be virtually anywhere in the sewer shed. The filter housing or cartridge will hold the SSC filter that is open on the intake side of the fluid flow in order to prevent over-pressuring within the filter cartridge. It is appreciated that the housing of the filter cartridge can vary, where some housing would take higher pressure than others. Alternate embodiments can provide the filter to be used on the pressurized side of the pump.

The speed of the pump is controlled, with the objective being to collect a reasonable amount of solids without clogging the filter in the duration (i.e., length of time) of the sampling. The faster the flow the more solids would go through the filter. The apparatus or system can be set to sample for a duration, e.g., 24 hours, which can be based on the average bowel movement being once per day. Based on empirical studies, a 36-hour time frame is provided as a default, in order to be more inclusive of the population being sampled. In one example, using an example population of a sewer shed, the SSC system collects between 150 microliters of sample of which 5 microliters is utilized during the actual test.

According to one aspect, the pressure at the filter can be monitored and recorded. This recording of the pressure gives feedback to see the state of the filter over time, which allows the speed of the pump to be increased or decreased, as needed. In one or more embodiments, the RPM of the pump is monitored so the speed can be controlled to an actual RPM rather than a percentage of full pump speed at a given voltage. This monitoring of the RPM addresses the condition that, as the battery voltage goes down, the pump would slow down, without some programmed response to keep the flow at a specific level.

According to one aspect, a wireless interface is provided at the controller to enable the controller to wirelessly interface with a smart phone or other user device. This embodiment allows more complicated remote management, programming, and remote activation, as well as enable for fault alert notifications.

The present disclosure also provides temperature control mechanisms to ensure that the collected sample does not reach or surpass temperatures over a threshold temperature, e.g., 50 to 60 degrees Fahrenheit. The present disclosure provides for a passive cooling source. Also, an insulated sleeve is placed on the filter, followed by an ice sleeve surrounding the filter cartridge. The insulated sleeve would insulate the ice from the incoming liquid flow, but keep the filter cartridge in a cold environment once the sampling is completed. This method conserves and extends the cooling provided by the ice. The use of an ice sleeve and/or insulated container that can be filled with ice, where needed, enables the cartridge to be maintained at or below the set threshold temperature. The disclosure appreciates that if the filter were simply placed in ice, the new fluid coming into the filter provides a constant source of incoming heat or frictional energy, reducing the amount of ice more quickly than desired.

According to one advanced implementation, a delay can be programmed to start cooling the sample once the sampling is completed. This embodiment requires the cooling mechanism to be mechanical and programmable or remotely activated. According to one embodiment, the filter housing could be self-sealing, such that when the liquid conduits are removed from the end-caps, the housing isolates the collected sample from human contact. The housing is also designed to be locked/sealed and mailed to a lab or other destination for testing, as not all collection occurs in places that have the ability to conduct the required/desired tests on the collected sample. The filter cartridge can be disposable or can be reusable, particularly if the testing and sampling are being done by the same group.

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A system for continuous sampling of a liquid source, the system comprising:
   a portable enclosure providing an interior space whose temperature is moderated by at least one temperature control mechanism to be within a desired temperature range for sample collection and storage during a collection cycle;
   a container having an interior volume surrounded by an exterior surface with at least one inlet for receiving an intake liquid flow comprising a sample being collected within the container, the container placed within the enclosure and collecting the sample via the intake liquid flow;
   a temperature control sleeve comprising an inner bore that is circumferentially able to fit around an exterior wall of the container, an outer surface of the temperature control sleeve made with a material capable of retaining a desired temperature range within the sleeve, and a body section disposed between the inner bore and the outer surface and within which a mechanical cooling mechanism is provided, the mechanical cooling mechanism controllable to maintain an ambient temperature of contents within the container within a preset temperature range;
   an intake liquid conduit extending through a sidewall of the enclosure and having a first end in fluid connection with the interior space of the enclosure and having a second end opposed to the first end, the intake liquid conduit extendable to have the second end submerged into a liquid source from which the sample is being collected;
   a pump comprising an inlet connector and an outlet connector, the inlet connector in fluid connection with the intake liquid conduit to suction intake liquid flow from the liquid source, the pump being a programmable variable speed pump that can provide different amounts of suction force on liquid within the intake liquid conduit to control a rate of the intake liquid flow; and
   a controller communicatively coupled to an electrical motor of the pump, and which transmits, to the electrical motor of the pump, a pump activation signal comprising pump speed and length of time for sample collection, the pump activation signal activating the pump to initiate suction at the inlet connector, wherein the pump suctions intake liquid at a flow rate that allows continuous sampling of the liquid source over an entirety of the length of time.

2. The system of claim 1, further comprising the at least one temperature control mechanism for maintaining a temperature of the interior space within the desired temperature range, the temperature control mechanism comprising one or more of: an insulated exterior wall, a padding of insulated foam or other insulated material within the interior space and surrounding the container, a mechanical cooling source inside of the interior space, a mechanical cooling source outside the enclosure and in fluid connection with the interior space, and an ice pack placed within the interior space.

3. The system of claim 1, wherein the intake liquid flow is maintained at an ambient temperature of the interior space while the sample is being collected.

4. The system of claim 1, wherein the intake liquid conduit comprises an exterior shield of insulating material to minimize exterior heating and cooling on the liquid flowing into the interior space through an exposed section of the intake liquid conduit.

5. The system of claim 1, wherein:
   the container is a solid sample collection container that presents a filter housing;
   a first end of the intake liquid conduit is connected to an inlet port of the container; and the container further comprises:
      an outlet port that is in fluid connection with an inner volume of the container, the outlet port further in fluid connection with the inlet connector of the pump via a connecting outlet liquid conduit, whereby intake liquid flows from the inlet port through the container and out the output port, suctioned through the inlet connector of the pump; and
      a removable filter placed within the inner volume of the container with an open end facing the inlet port and a closed end proximate to the outlet port, wherein intake liquid flows through the filter, which removes the solid sample from a liquid medium and retains the solid sample within the filter.

6. The system of claim 5, wherein the container comprises a volumetric body and a removable cover that sealably fits on top of a receiving end of the volumetric body to create a sealed container volume with the filter placed therein.

7. The system of claim 1, further comprising:
   a primary pump having a first intake in fluid connection with the intake liquid conduit and which suctions, via the intake liquid conduit, a larger volume of liquid into the interior space of the enclosure than required for sample collection, to enable the sample collection to occur within a desired temperature range of the interior space, the primary pump also having a first outlet in fluid connection with a first outlet liquid conduit that enables expulsion of non-collected liquid out of the system, the primary pump communicatively connected to the controller and receiving control inputs from the controller;
   wherein:
   the container is a solid sample collection container that presents a filter housing;
   the pump is a secondary pump located within the interior space of the enclosure; and
   the intake liquid conduit comprises a conduit connector with a second intake liquid conduit coupled thereto, the second intake liquid conduit extending from the conduit connector and coupled to the at least one inlet of the container; and
   the container further comprises:
      an outlet port that is in fluid connection with an inner volume of the container, the outlet port further in fluid connection with the inlet connector of the secondary pump via a connecting outlet liquid conduit connected to the outlet port, whereby intake liquid flows from the inlet port through the container and out the output port, suctioned through the inlet connector of the pump; and a removable filter placed within the inner volume of the container with an open end facing the inlet port and a closed end proximate to the outlet port, wherein intake liquid flows through the filter, which removes the solid sample from a liquid medium and retains the solid sample within the filter.

8. The system of claim 7, further comprising:
a second outlet liquid conduit with a first end in fluid connection to the outlet connector of the secondary pump and a second end in fluid connection to the conduit connector, upstream of the flow of liquid within the intake liquid conduit relative to the second intake liquid conduit;
wherein the controller triggers the primary pump to operate at a rate that suctions the larger volume of liquid through the intake liquid conduit and the controller further triggers the secondary pump to operate at a rate that only suctions as much of the liquid sample from within the intake liquid conduit as required to collect the solid sample within the removable filter.

9. The system of claim 8, further comprising:
a pressure sensor communicatively connected to the controller; and
the controller:
monitors, via the pressure sensor, a pressure reading at an inlet to the pump to sense a filter pressure; and
dynamically modifies a flow rate of the pump based on the pressure reading.

10. The system of claim 1, wherein:
the container is a volumetric liquid sample collection container that retains the intake liquid sample;
the intake liquid conduit is in fluid connection with the intake connector of the pump; and
the system further comprises an outlet liquid conduit with a first end in fluid connection to the outlet connector of the pump and a second end terminating inside of the liquid sample collection container, wherein the controller programs the pump to operate at a rate that only suctions as much of the liquid sample as can be stored within the liquid sample collection container.

11. The system of claim 1, wherein:
the container is a volumetric liquid sample collection container that retains the intake liquid sample;
the pump is a secondary pump located within the interior space of the enclosure;
the intake liquid conduit comprises a conduit connector with a second intake liquid conduit coupled thereto to fluidly connect with the intake connector of the secondary pump; and
the system further comprises:
a primary pump having a first intake in fluid connection with the intake liquid conduit and which suctions, via the intake liquid conduit, a larger volume of liquid into the interior space of the enclosure than required for sample collection, to enable the sample collection to occur within a desired temperature range of the interior space, the primary pump also having a first outlet in fluid connection with a first outlet liquid conduit that enables expulsion of non-collected liquid out of the system, the primary pump communicatively connected to the controller and receiving control inputs from the controller; and
a second outlet liquid conduit with a first end in fluid connection to the outlet connector of the secondary pump and a second end terminating inside of the liquid sample collection container;
wherein the controller triggers the primary pump to operate at a rate that suctions the larger volume of liquid through the intake liquid conduit and the controller further triggers the secondary pump to operate at a rate that only suctions as much liquid sample from within the intake liquid conduit as can be stored within the liquid sample collection container.

12. The system of claim 1, wherein the controller:
turns off the pump in response to at least one of (i) expiration of an established collection time or (ii) collection of a preset amount of sample.

13. The system of claim 1, further comprising:
a wireless receiver integrated within a control board of the controller and communicatively connected to the controller; and
a flow rate sensor with wireless transmitting capability, the flow rate sensor submerged within the liquid source at a location proximate to the intake end of the intake liquid conduit, the flow rate sensor monitoring the flow rate of the liquid source and wirelessly transmit the flow rate to the controller;
wherein the controller:
receives, via the wireless receiver, the flow rate of the liquid source; and
calculates and dynamically adjusts an operating speed of the pump, in part based on the flow rate of the liquid source.

14. The system of claim 1, further comprising:
a wireless transceiver communicatively connected to the controller; and
the controller:
receives via the wireless transceiver, one or more inputs from a wirelessly connected user device, the inputs being one or more of a group comprising: an amount of the sample to be collected, a pump speed, a length of time for sample collection, a notification requirement on completion of sample collection, and the pump activation signal to initiate suction at the inlet connector;
calculates a pump speed of the pump that will cause the pump to operate and collect the amount of the sample, the calculation based on retrieved and received data from among pump speed calculation data comprising: characteristics of the pump, the amount of the sample to be collected, and the length of time; and
wirelessly connects to and transmits one or more signals and data from among process status data, error signals, and collection completion signals, to a user device communicatively connected to the wireless transceiver.

15. The system of claim 1, further comprising a display coupled to the controller, and the controller further:
presents information on the display related to an ongoing sampling; and
visually identifies relevant information related to the sampling, the relevant information comprising when the sampling is completed.

16. An apparatus for collecting samples from a liquid source, the apparatus comprising:
a portable enclosure providing an interior space;
a container having an interior volume surrounded by exterior walls with at least one inlet for receiving an intake liquid flow comprising a sample being collected within the container;
the container placed within the enclosure;

an intake liquid conduit extending through a sidewall of the enclosure and having a first end in fluid connection with and extending from the at least one inlet of the container and having a second end opposed to the first end, the intake liquid conduit extendable to have the second end submerged into a liquid source from which the sample is being collected;

a temperature control sleeve comprising an inner bore that is circumferentially able to fit around an exterior wall of the container, an outer surface of the temperature control sleeve made with a material capable of retaining a desired temperature range within the sleeve, and a body section disposed between the inner bore and the outer surface and within which a mechanical cooling mechanism is provided, the mechanical cooling mechanism controllable to maintain an ambient temperature of contents within the container within a preset temperature range;

a pump having an inlet connector in fluid connection with the intake liquid conduit to suction intake liquid flow from the liquid source, the pump being a programmable variable speed pump that can provided different amounts of suction force on intake liquid within the liquid conduit to control a rate of flow of the intake liquid; and a controller communicatively coupled to an electrical motor of the pump, and which:
  receives inputs identifying an amount of the sample to be collected and a length of time for collecting the sample;
  calculates a pump speed of the pump that will cause the pump to operate and collect the amount of the sample, the calculation based on retrieved and received data from among pump speed calculation data comprising: characteristics of the pump, the amount of the sample to be collected, and the length of time; and
  transmits, to the electrical motor of the pump, a pump activation signal comprising the pump speed and length of time, the pump activation signal activating the pump to initiate suction at the inlet connector;
  wherein the pump suctions the intake liquid at a flow rate that allows continuous sampling of the liquid source over an entirety of the length of time.

17. The apparatus of claim 16, wherein in calculating the pump speed, the controller calculates revolutions per minute (RPMs) of a rotating impeller of the pump.

* * * * *